US011409482B2

(12) United States Patent
Tsuchiya

(10) Patent No.: US 11,409,482 B2
(45) Date of Patent: Aug. 9, 2022

(54) COMMUNICATION APPARATUS

(71) Applicant: CANON KABUSHIKI KAISHA, Tokyo (JP)

(72) Inventor: Keigo Tsuchiya, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/344,456

(22) Filed: Jun. 10, 2021

(65) Prior Publication Data
US 2021/0405940 A1    Dec. 30, 2021

(30) Foreign Application Priority Data

Jun. 29, 2020    (JP) .............................. JP2020-111974

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1236* (2013.01); *G06F 3/1203* (2013.01); *G06F 3/1286* (2013.01); *G06F 3/1292* (2013.01); *G06F 3/1293* (2013.01); *H04N 1/00095* (2013.01); *H04N 2201/0094* (2013.01)

(58) Field of Classification Search
CPC .... G06F 3/1236; G06F 3/1203; G06F 3/1286; G06F 3/1292; G06F 3/1293; H04N 1/00095; H04N 2201/0094
USPC .............................. 358/1.15, 1.14, 1.13, 1.1
See application file for complete search history.

(56) References Cited

U.S. PATENT DOCUMENTS

| 10,455,630 | B2* | 10/2019 | Tanji ..................... H04W 76/14 |
| 2013/0260686 | A1 | 10/2013 | Mukherjee | |
| 2014/0323131 | A1* | 10/2014 | Yun ....................... H04W 76/15 455/436 |
| 2017/0339743 | A1 | 11/2017 | Watanabe | |

FOREIGN PATENT DOCUMENTS

JP    2014216956 A    11/2014

* cited by examiner

*Primary Examiner* — Douglas Q Tran
(74) *Attorney, Agent, or Firm* — Canon U.S.A., Inc. I.P. Division

(57) ABSTRACT

A communication apparatus performs communication processing in the first communication mode and the second communication mode to set a communication period of the first communication mode per unit time to be longer than that of the second communication mode in a case where both the first communication mode and the second communication mode are enabled, a communication partner apparatus in the first communication mode is determined, and a communication partner apparatus in the second communication mode is not determined.

17 Claims, 21 Drawing Sheets

FIG.12

```
I/F SELECTION

1. WIRELESS LAN
2. WIRED LAN
3. USB
```

FIG.20A
STANDBY TABLE

|  | WIRELESS INFRASTRUCTURE MODE | P2P MODE |
|---|---|---|
| OPERATION STATE | NOT CONNECTED | NOT CONNECTED |
| PRIORITY FLAG | DISABLED | DISABLED |
| TIME DIVISION OCCUPANCY | 50% | 50% |

FIG.20B
WIRELESS INFRASTRUCTURE CONNECTION PRIORITY TABLE

|  | WIRELESS INFRASTRUCTURE MODE | P2P MODE |
|---|---|---|
| OPERATION STATE | CONNECTED | NOT CONNECTED |
| PRIORITY FLAG | ENABLED | DISABLED |
| TIME DIVISION OCCUPANCY | 75% | 25% |

FIG.20C
P2P CONNECTION PRIORITY TABLE

|  | WIRELESS INFRASTRUCTURE MODE | P2P MODE |
|---|---|---|
| OPERATION STATE | NOT CONNECTED | CONNECTED |
| PRIORITY FLAG | DISABLED | ENABLED |
| TIME DIVISION OCCUPANCY | 25% | 75% |

FIG.20D
FULL ACTIVE TABLE

|  | WIRELESS INFRASTRUCTURE MODE | P2P MODE |
|---|---|---|
| OPERATION STATE | CONNECTED | CONNECTED |
| PRIORITY FLAG | ENABLED | ENABLED |
| TIME DIVISION OCCUPANCY | 50% | 50% |

STANDBY TABLE

WIRELESS INFRASTRUCTURE CONNECTION PRIORITY TABLE

P2P CONNECTION PRIORITY TABLE

FULL ACTIVE TABLE

COMMUNICATION APPARATUS

BACKGROUND

Field

The present invention relates to a communication apparatus.

Description of the Related Art

There are communication apparatuses capable of operating in a plurality of communication modes, like performing wireless communication in an infrastructure mode and a direct mode in parallel, as discussed in Japanese Patent Application Publication Laid-Open No. 2014-216956.

The use of wireless communications has been increasing in recent years, and there has been a demand to improve the convenience of wireless communications.

The present disclosure is directed to improving the convenience of wireless communications.

SUMMARY

According to an aspect of the present invention, a communication apparatus that includes a communication unit configured to perform a first communication mode in which the communication unit communicates with a terminal apparatus via wireless communication with an external wireless base station and a second communication mode in which the communication unit directly performs wireless communication with the terminal apparatus without intervention of the external wireless base station, the communication apparatus includes a setting unit configured to enable at least either one of the first communication mode and the second communication mode, and a control unit configured to perform communication processing in the first communication mode and the second communication mode to set a communication period of the first communication mode per unit time to be longer than that of the second communication mode in a case where both the first communication mode and the second communication mode are enabled, a communication partner apparatus in the first communication mode is determined, and a communication partner apparatus in the second communication mode is not determined, and perform the communication processing in the first communication mode and the second communication mode to set the communication period of the second communication mode per unit time to be longer than that of the first communication mode in a case where both the first communication mode and the second communication mode are enabled, the communication partner apparatus in the second communication mode is determined, and the communication partner apparatus in the first communication mode is not determined.

Further features of the present invention will become apparent from the following description of exemplary embodiments with reference to the attached drawings.

BRIEF DESCRIPTION OF THE DRAWINGS

FIG. 12 is a diagram illustrating an example of an interface selection screen upon initial activation.

FIGS. 20A, 20B, 20C and 20D are diagrams illustrating examples of wireless control setting tables.

DESCRIPTION OF THE EMBODIMENTS

Exemplary embodiments of the present disclosure will be described in deal below with reference to the drawings. It should be noted that the exemplary embodiments are just examples, and specific examples of the components, processing steps, and display screens are not intended to limit the scope of the present disclosure unless otherwise specified.

(System Configuration)

Figure 1:
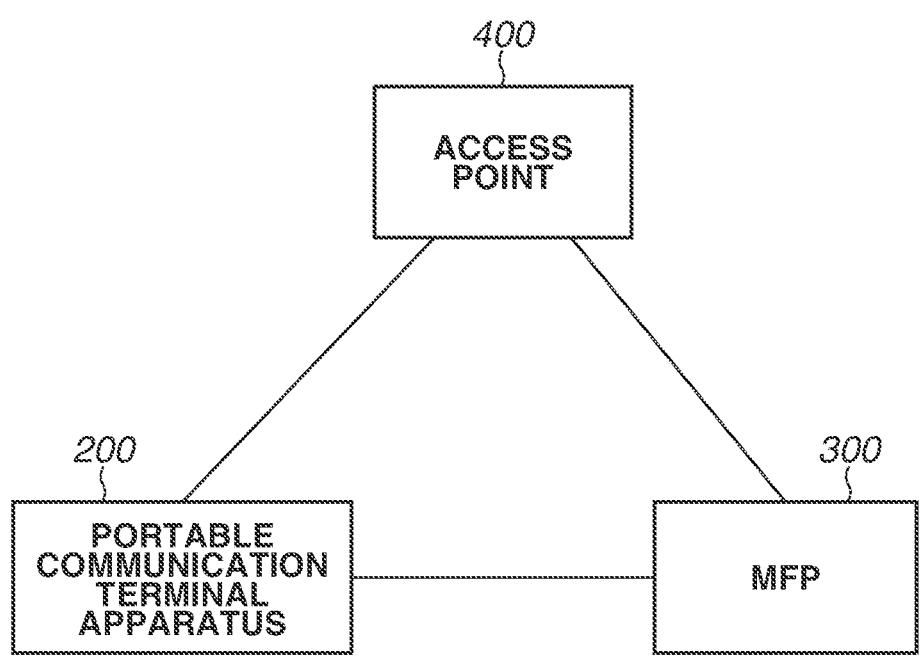
FIG. 1 is a diagram illustrating an example of a system configuration.

FIG. 1 illustrates a configuration example of a system according to an exemplary embodiment. For example, this system is a wireless communication system where a plurality of communication apparatuses can wirelessly communicate with each other. In the example of FIG. 1, the system includes a portable communication terminal apparatus 200, a multifunction peripheral (MFP) 300, and an access point 400 as the communication apparatuses. The portable communication terminal apparatus 200 may be referred to simply as a terminal apparatus 200.

The terminal apparatus 200 is a terminal apparatus (information processing apparatus) having wireless communication functions using a wireless local area network (LAN)

and Bluetooth®. The wireless LAN may hereinafter be referred to as a WLAN. The terminal apparatus 200 can be a personal information terminal, such as a personal digital assistant (PDA), a mobile phone, or a digital camera. The MFP 300 is a printing apparatus having a print function. The MFP 300 may further include a reading function (scanner), a facsimile (FAX) function, and a telephone function. The MFP 300 according to the present exemplary embodiment has a communication function capable of wireless communication with the terminal apparatus 200. The present exemplary embodiment describes a case of using the MFP 300 as an example. However, this is not restrictive. For example, a FAX apparatus, a scanner apparatus, a projector, a mobile terminal, a smartphone, a laptop personal computer (PC), a tablet terminal, a PDA, a digital camera, a music player device, and a television set each having communication functions may be used instead of the MFP 300. The access point 400 is provided separate from (outside) the terminal apparatus 200 and the MFP 300, and operates as a WLAN base station apparatus. The access point 400 may be referred to as an external access point 400 or an external wireless base station (or external master station). Communication apparatuses having a WLAN communication function can communicate in a WLAN infrastructure mode via the access point 400. An access point may hereinafter be referred to as an "AP". The infrastructure mode may be referred to as a "wireless infrastructure mode". The access point 400 performs wireless communication with a communication apparatus permitted (authenticated) to connect to the own apparatus, and relays wireless communication between the communication apparatus and another communication apparatus. The access point 400 is connected to a wired communication network, for example, and can relay communication between a communication apparatus connected to the wired communication network and another communication apparatus wirelessly connected to the access point 400.

The terminal apparatus 200 and the MFP 300 can perform wireless communication in the wireless infrastructure mode via the external access point 400 and in a peer-to-peer mode without the intervention of the external access point 400 by using their WLAN communication functions. Peer-to-peer will hereinafter be referred to as "P2P". P2P modes include a Wi-Fi Direct (registered trademark) mode and a software AP mode. The Wi-Fi Direct (registered trademark) may hereinafter be referred to as WFD. The terminal apparatus 200 and the MFP 300 may perform P2P communication by using a Bluetooth® communication function. For the sake of distinction, P2P using the WLAN communication function and P2P using the Bluetooth® communication function may be referred to as P2P (WLAN) and P2P (Bluetooth®), respectively. In other words, P2P (WLAN) can be said to be communication compliant with the Institute of Electrical and Electronics Engineers (IEEE) 802.11 series. In the present exemplary embodiment, as will be described below, the terminal apparatus 200 and the MFP 300 can perform processing corresponding to a plurality of print services by using WLAN communication.

(External Configuration of Terminal Apparatus)

Figure 2:
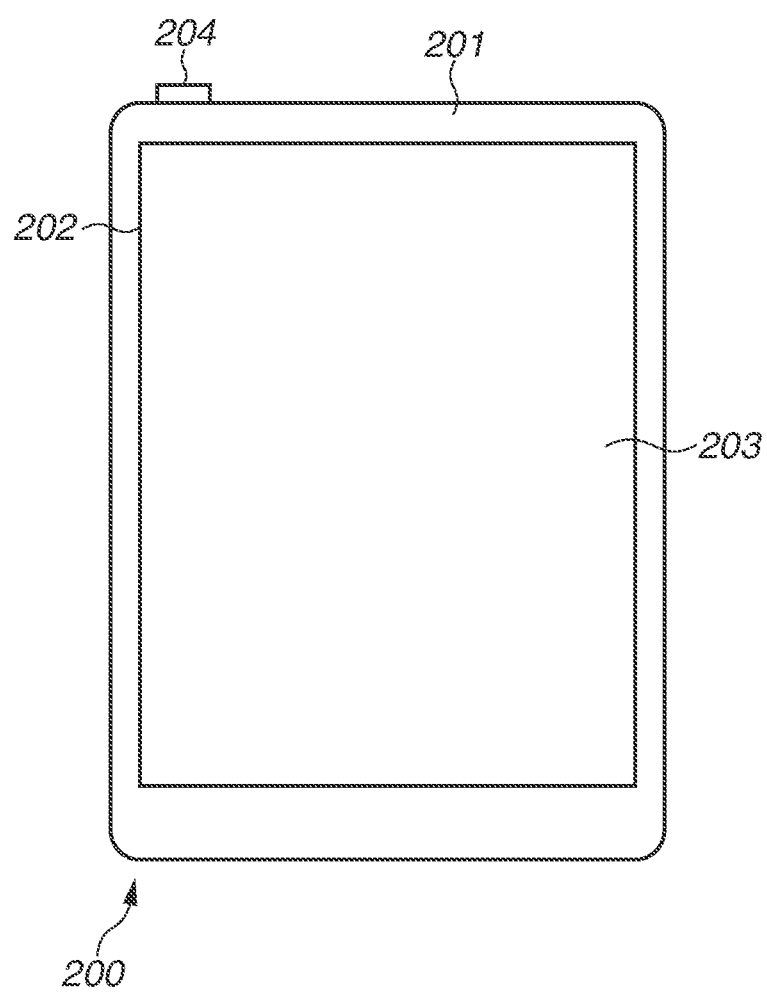
FIG. 2 is a diagram illustrating an example of an external configuration of a portable communication terminal apparatus.

FIG. 2 is a diagram illustrating an example of an external configuration of the terminal apparatus 200. In the present exemplary embodiment, the terminal apparatus 200 will be described to be an average smartphone, for example. The terminal apparatus 200 includes a display unit 202, an operation unit 203, and a power key 204, for example. An example of the display unit 202 is a display including a display mechanism of liquid crystal display (LCD) type. Alternatively, the display unit 202 may display information by using light-emitting diodes (LEDs), for example. The terminal apparatus 200 may have a function of outputting information using sound in addition to or instead of the display unit 202. The operation unit 203 includes hardware keys, such as a key and a button, and/or a touch panel for detecting user operations. Since, in the present exemplary embodiment, information display by the display unit 202 and acceptance of user operations by the operation unit 203 are performed using a common touch panel display, the display unit 202 and the operation unit 203 are implemented by a single device. In such a case, for example, button icons and a software keyboard are displayed by the display function of the display unit 202, and a user's touch on such a portion is detected by the operation acceptance function of the operation unit 203. Alternatively, the display unit 202 and the operation unit 203 may be separated to provide a piece of hardware for display and a piece of hardware for operation acceptance separately. The power key 204 is a hardware key for accepting a user operation for powering on/off the terminal apparatus 200.

The terminal apparatus 200 includes a WLAN unit 201 for providing the WLAN communication function, which is not necessarily visible from outside. The WLAN unit 201 is configured to be capable of data (packet) communication in a WLAN system compliant with the IEEE 802.11 standard series (such as IEEE 802.11a/b/g/n/ac/ax), for example. However, this is not restrictive, and the WLAN unit 201 may be capable of communication in a WLAN system compliant with other standards. In the present example, the WLAN unit 201 can communicate in both 2.4- and 5-GHz frequency bands. The WLAN unit 201 can perform WDF-based communication, communication in the software AP mode, and communication in the wireless infrastructure mode. Operations in such modes will be described below. The terminal apparatus 200 further includes a Bluetooth® unit (not illustrated), which is not visible from outside. The Bluetooth® unit is compliant with the IEEE 802.15.1 standard, and provides 2.4-GHz communication functions used in Bluetooth® 1.1 to 5.0, such as Bluetooth® Basic Rate/Enhanced Data Rate (BR/EDR), Bluetooth®+High Speed (HS), and Bluetooth® Low Energy. Bluetooth® operations will be described below.

(External Configuration of MFP)

Figure 3:
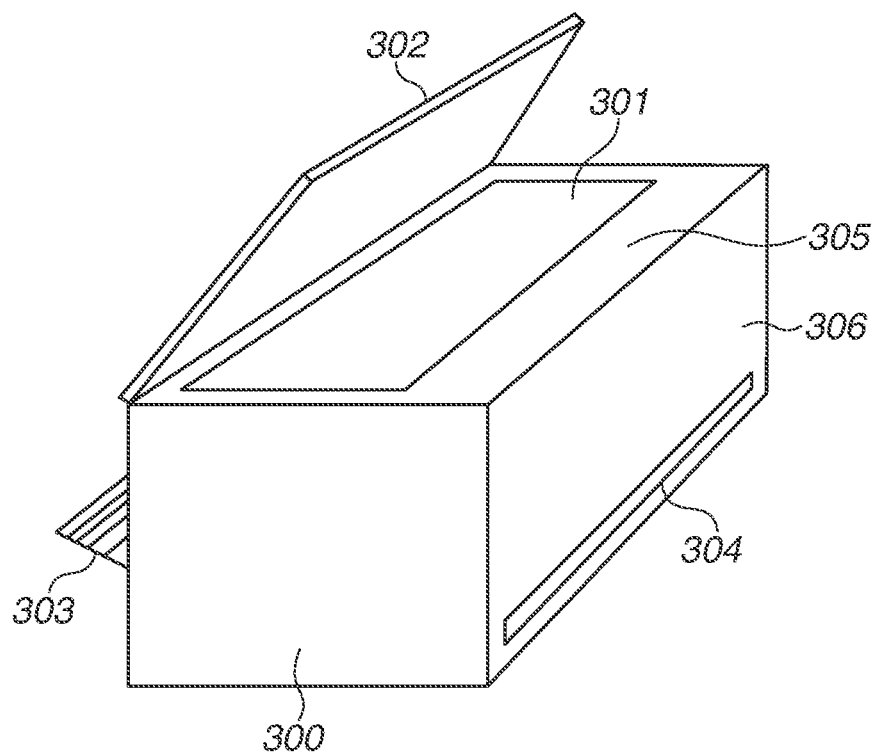
FIG. 3 is a diagram illustrating an example of an external configuration of a multifunction peripheral (MFP).

FIG. 3 illustrates an example of an external configuration of the MFP 300. For example, the MFP 300 includes a document platen 301, a document lid 302, a print sheet insertion port 303, a print sheet discharge port 304, and an operation display unit 305. The document platen 301 is a platen on which a document to be read is placed. The document lid 302 is a lid for holding down the document placed on the document platen 301 and preventing light from a light source for irradiating the document during reading from leaking outside. The print sheet insertion port 303 is an insertion port where various sizes of sheets can be set. The print sheet discharge port 304 is a discharge port for discharging a printed sheet. Sheets set in the print sheet insertion port 303 are conveyed to a printing unit one by one, printed on the printing unit, and then discharged from the print sheet discharge port 304. The operation display unit 305 includes keys, such as character input keys, cursor keys, an OK key, and a cancel key, LEDs, and an LCD. The operation display unit 305 is configured to be capable of accepting user's operations for activating various functions of the MFP 300 and performing various settings. The operation display unit 305 may include a touch panel display. The MFP 300 has WLAN and Bluetooth® wireless communication functions, and includes a wireless communication antenna 306 for wireless communication, which is not necessarily visible from outside. Like the terminal apparatus 200, the MFP 300 can also perform wireless communication in 2.4- and 5-GHz frequency bands using a WLAN and Bluetooth®.

Figure 4A:
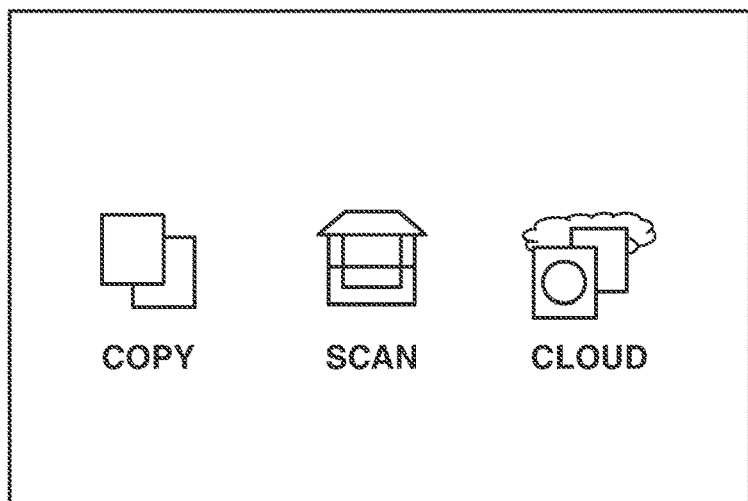
FIGS. 4A, 4B, and 4C are diagrams each illustrating an example of an operation display unit of the MFP.
Figure 4B:
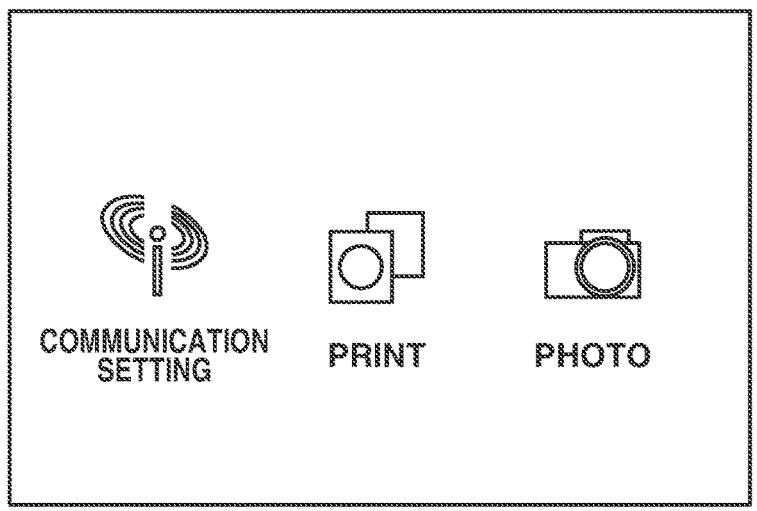
Figure 4C:
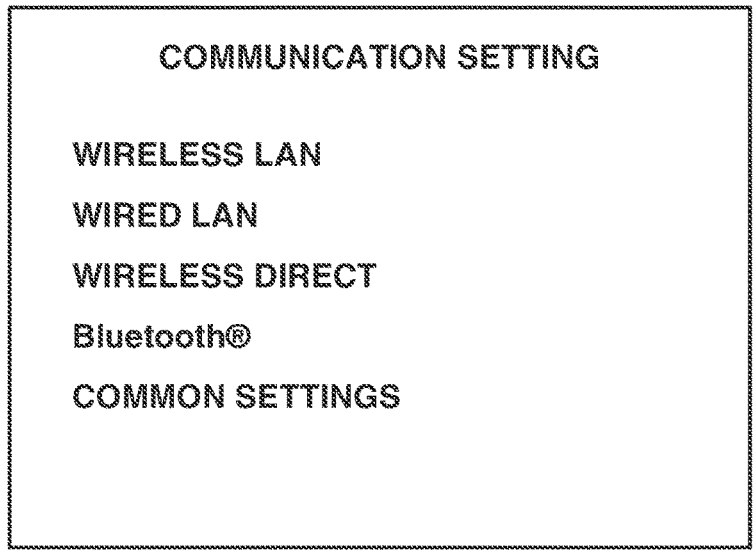

FIGS. 4A to 4C schematically illustrate examples of screen display on the operation display unit 305 of the MFP 300. FIG. 4A illustrates an example of a home screen that is displayed in a state where the MFP 300 is powered on and any operation, such as print and scan operations, is not performed (idle state, standby state). In a case where a menu display item of a copy function, a scan function, or a cloud function using the Internet communication is selected by a key operation or a touch panel operation, the MFP 300 can start to perform the corresponding setting or function. By accepting key operations or touch panel operations on the home screen of FIG. 4A, the MFP 300 can display screens different from the home screen of FIG. 4A in a seamless manner. FIG. 4B illustrates an example of such a screen, where menu items for performing a print function, performing a photo function, and changing communication settings are displayed. The print and photo functions can be performed and the communication settings can be performed based on user selections on this screen. FIG. 4C illustrates an example of an interface (I/F) selection screen that is displayed in a case where a menu item for changing communication setting is selected on the screen of FIG. 4B. On this screen, various LAN setting menu items ("wired LAN", "wireless LAN", and "wireless direct") for performing a wired connection setting, an on/off setting of the wireless infrastructure mode, and on/off settings of the P2P modes, such as the WFD and software AP modes, are displayed in a selectable manner. In a case where the wireless LAN is set to on by a user operation in FIG. 4C, the wireless infrastructure mode is enabled. In a case where the wireless direct is set to on by a user operation, the P2P (WLAN) mode is enabled. This screen also displays a setting menu item ("Bluetooth®") intended for Bluetooth® setting, such as a Bluetooth® on/off setting, in a selectable manner. The screen further displays a common setting menu item related to various connection modes. The user can also set the frequency band and frequency channel of the wireless LAN and a Bluetooth® pairing code on this screen.

(Configuration of Terminal Apparatus)

Figure 5:
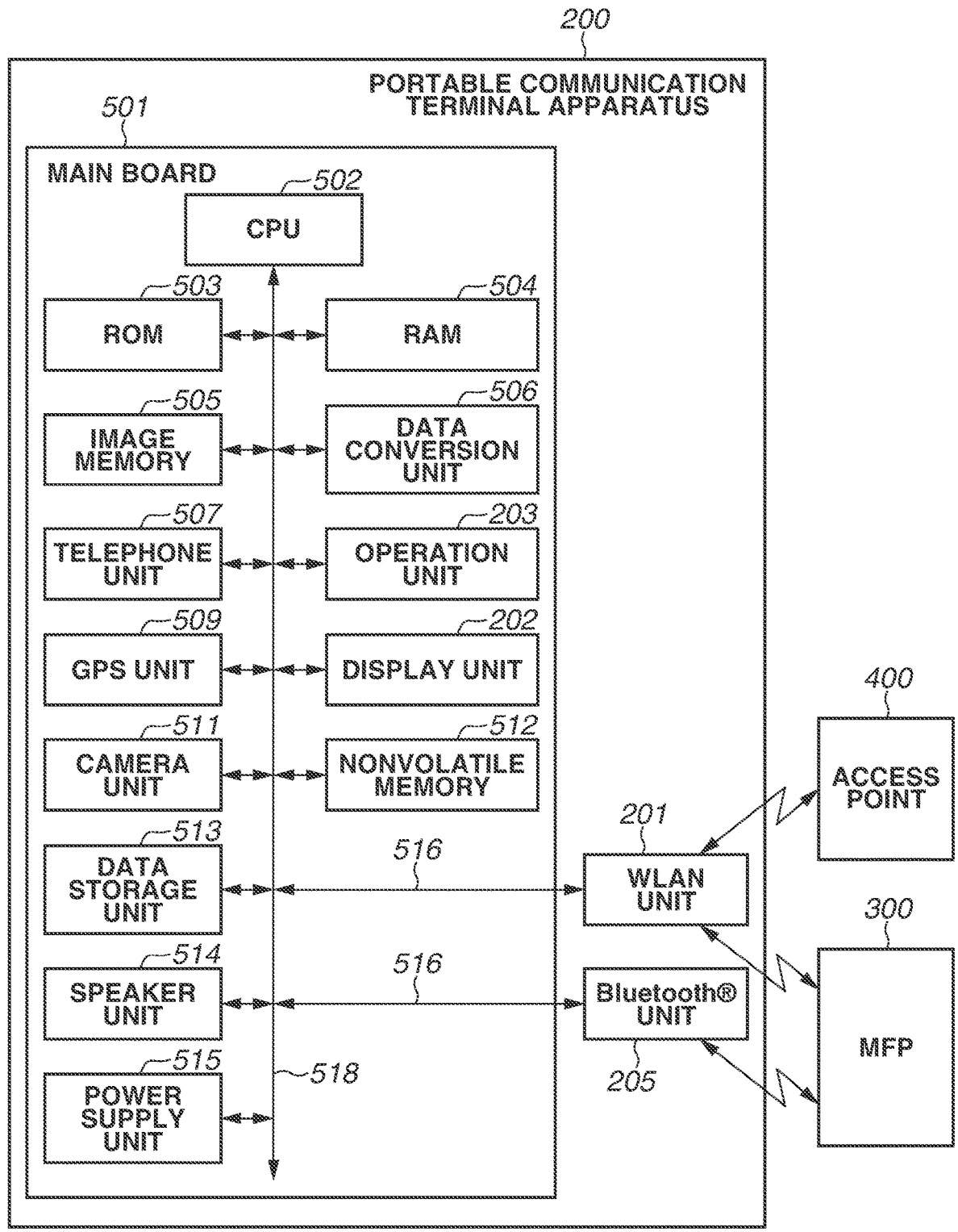
FIG. 5 is a block diagram illustrating a configuration example of the portable communication terminal apparatus.

FIG. 5 illustrates a configuration example of the terminal apparatus 200. For example, the terminal apparatus 200 includes a main board 501 that performs main control on the own apparatus, the WLAN unit 201 that performs WLAN communication, and a Bluetooth® unit 205 that performs Bluetooth® communication. The main board 501 includes a central processing unit (CPU) 502, a read-only memory (ROM) 503, a random access memory (RAM) 504, an image memory 505, a data conversion unit 506, a telephone unit 507, a Global Positioning System (GPS) unit 509, a camera unit 511, a nonvolatile memory 512, a data storage unit 513, a speaker unit 514, and a power supply unit 515. Here, the terminal apparatus 200 includes the display unit 202 and the operation unit 203. Such functional units in the main board 501 are connected to each other via a system bus 518 managed by the CPU 502. The main board 501, the WLAN unit 201, and the Bluetooth® unit 205 are connected via dedicated buses 516, for example.

The CPU 502 is a system control unit and controls the entire terminal apparatus 200. The processing of the terminal apparatus 200 to be described below is implemented, for example, by the CPU 502 executing a program stored in the ROM 503. Pieces of hardware dedicated for respective processes may be provided. The ROM 503 stores control programs and a built-in operating system (OS) program that are executed by the CPU 502. In the present exemplary embodiment, the CPU 502 performs software control, such as scheduling and task switching, by executing the control programs stored in the ROM 503 under the management of the built-in OS that is similarly stored in the ROM 503. The RAM 504 includes a static RAM (SRAM). The RAM 504 stores data, such as program control variables, and data, such as setting values registered by the user, and management data on the terminal apparatus 200. The RAM 504 can also be used as various work buffers. The image memory 505 includes a memory, such as a dynamic RAM (DRAM). The image memory 505 temporarily stores image data received via the WLAN unit 201 and/or the Bluetooth® unit 205 and image data read from the data storage unit 513 for the sake of processing by the CPU 502. The nonvolatile memory 512 includes a memory, such as a flash memory, for example. The nonvolatile memory 512 retains data even after the terminal apparatus 200 is powered off. The memory configuration of the terminal apparatus 200 is not limited to the foregoing. For example, the image memory 505 and the RAM 504 may be shared. The data storage unit 513 may be used for data backup. In the present exemplary embodiment, a DRAM is described as an example of the image memory 505. However, other recording media, such as a hard disk and a nonvolatile memory, may be used.

The data conversion unit 506 analyzes data of various formats, and performs data conversion, such as color conversion and image conversion. The telephone unit 507 implements telephone communication by controlling a telephone line and processing voice data input and output via the speaker unit 514. The GPS unit 509 receives radio waves transmitted from satellites to obtain position information, such as the current latitude and longitude of the terminal apparatus 200. The camera unit 511 has a function of electrically recording and encoding an image input via a lens. Image data captured by the camera unit 511 is stored into the data storage unit 513. The speaker unit 514 performs control to implement a function of inputting and outputting voice for the telephone function, and other functions including an alarm notification function. The power supply unit 515 is a portable battery, for example, and performs power supply control inside the terminal apparatus 200. Examples of a power supply state include a dead battery state where the remaining battery level is zero, a power-off state where the power key 204 is not pressed, an activated state where the terminal apparatus 200 is normally activated, and a power saving state where the terminal apparatus 200 is activated but with saved power. The display unit 202 refers to the display unit 202 described with reference to FIG. 2. The display unit 202 electrically controls its display contents to control display of various input operations as well as the operation state and status information (such as the remaining ink level and the remaining amount of sheets) of the MFP 300. The operation unit 203 refers to the operation unit 203 described with reference to FIG. 2. The operation unit 203 performs control to accept user operations, generate electrical signals corresponding to the operations, and output the electrical signals to the CPU 502.

The terminal apparatus 200 performs wireless communication using the WLAN unit 201 and the Bluetooth® unit 205, to perform data communication with other devices, such as the MFP 300. The WLAN unit 201 and the Bluetooth® unit 205 convert data into packets and transmit the packets to other devices. The WLAN unit 201 and the Bluetooth® unit 205 reconstruct original data from packets transmitted from other devices outside, and output the original data to the CPU 502. The WLAN unit 201 and the Bluetooth® unit 205 are units for implementing communication compliant with the WLAN and Bluetooth® standards, respectively. The WLAN unit 201 can operate in at least two communication modes including the wireless infrastructure mode and the P2P (WLAN) mode in parallel. The Bluetooth® unit 205 can operate in a communication mode compliant with Bluetooth® 1.1 to 5.0, for example. The frequency bands in such communication modes can be limited by the functionality and performance of the hardware.

(Configuration of MFP)

Figure 6:
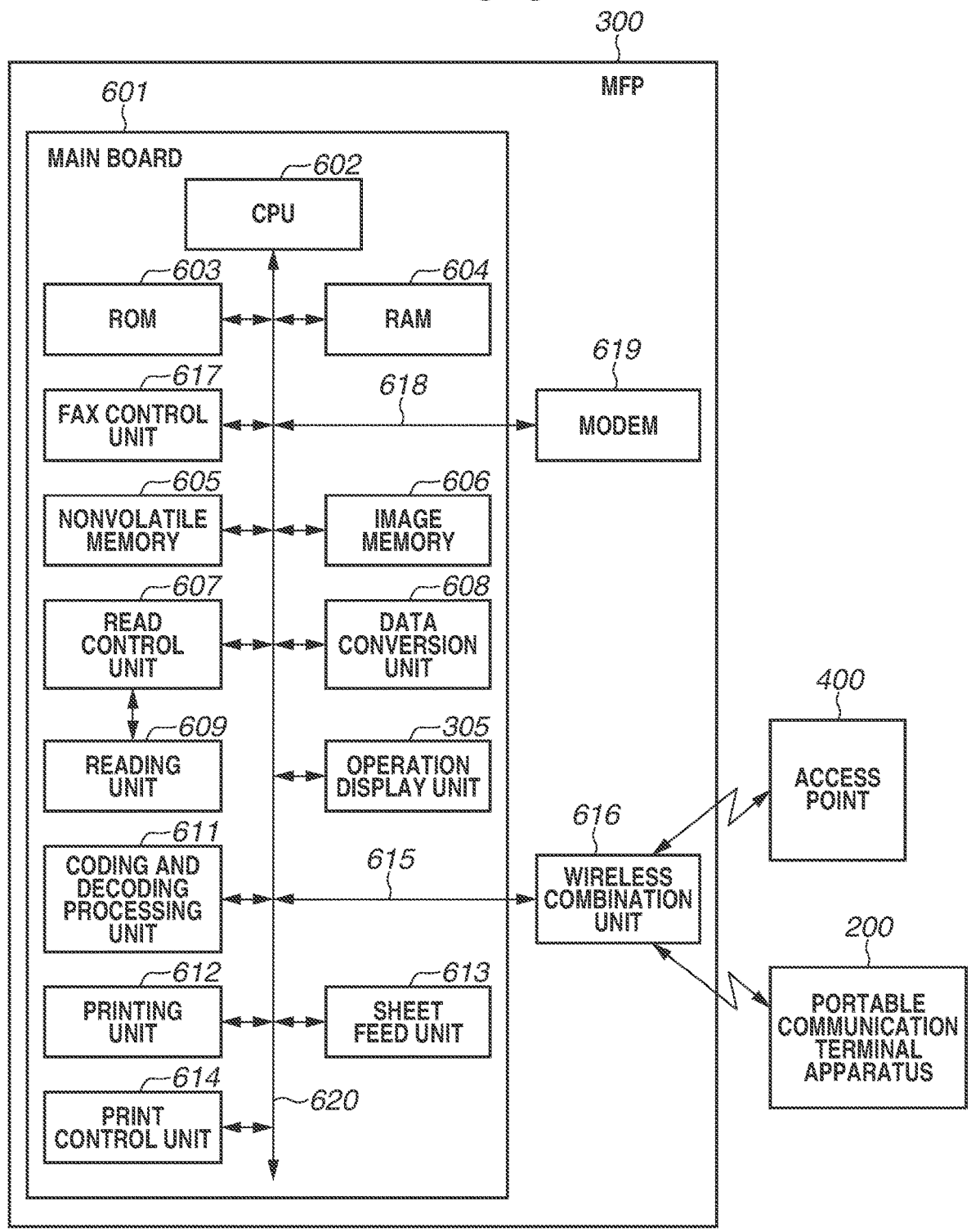
FIG. 6 is a block diagram illustrating a configuration example of the MFP.

FIG. 6 illustrates a configuration example of the MFP 300. The MFP 300 includes a main board 601 that performs main control on the own apparatus, and a wireless combination unit 616 that is a single communication module for performing WLAN communication and Bluetooth® communication using at least one common antenna. The MFP 300 also includes a modem 619 for performing wired communication, for example. The main board 601 includes, for example, a CPU 602, a ROM 603, a RAM 604, a nonvolatile memory 605, an image memory 606, a read control unit 607, a data conversion unit 608, a reading unit 609, and a coding and decoding processing unit 611. The main board 601 also includes a printing unit 612, a sheet feed unit 613, a print control unit 614, and the operation display unit 305, for example. Such functional units in the main board 601 are connected to each other via a system bus 620 managed by the CPU 602. The main board 601 and the wireless combination unit 616 are connected via a dedicated bus 615, for example. The main board 601 and the modem 619 are connected via a bus 618, for example.

The CPU 602 is a system control unit and controls the entire MFP 300. As an example, the processing of the MFP 300 to be described below is implemented by the CPU 602 executing a program stored in the ROM 603. Pieces of hardware dedicated for respective processes may be provided. The ROM 603 stores control programs and a built-in OS program that are executed by the CPU 602. In the present exemplary embodiment, the CPU 602 performs software control such as scheduling and task switching by executing the control programs stored in the ROM 603 under the management of the built-in OS that is similarly stored in the ROM 603. The RAM 604 includes an SRAM. The RAM 604 stores data such as program control variables, and data such as setting values registered by the user and management data on the MFP 300. The RAM 604 can also be used as various work buffers. The nonvolatile memory 605 includes a memory, such as a flash memory, for example. The nonvolatile memory 605 retains data even after the MFP 300 is power off. The image memory 606 includes a memory such as a DRAM. The image memory 606 stores image data received via the wireless combination unit 616 and image data processed by the coding and decoding processing unit 611. Like the terminal apparatus 200, the memory configuration of the MFP 300 is not limited to the foregoing. The data conversion unit 608 analyzes data of various formats and converts image data into print data.

The read control unit 607 controls the reading unit 609 (for example, a contact image sensor (CIS)) to optically read a document placed on the document platen 301. The read control unit 607 converts an image obtained by optically reading the document into electrical image data (image signal), and outputs the image data. The read control unit 607 here may apply various types of image processing, such as binarization processing and halftone processing, before outputting the image data. The operation display unit 305 refers to the operation display unit 305 described with reference to FIGS. 4A to 4C. The operation display unit 305 performs display control as well as generation control on electric signals corresponding to user operations.

The coding and decoding processing unit 611 performs coding processing and decoding processing on image data (such as Joint Photographic Experts Group (JPEG) data and Portable Network Graphics (PNG) data) that is handle by the MFP 300, and enlargement and reduction processing. The sheet feed unit 613 stores sheets for printing. The sheet feed unit 613 can supply set sheets under the control of the print control unit 614. The sheet feed unit 613 may include a plurality of sheet feed units to store a plurality of types of sheets in one apparatus. Which of the sheet feed units to feed sheets can be controlled under the control of the print control unit 614. The print control unit 614 applies various types of image processing, including smoothing processing, print density correction processing, and color correction, to the image data to be printed, and outputs the processed image data to the printing unit 612. The printing unit 612 is configured to be capable of performing inkjet print processing, for example. The printing unit 612 records an image on a recording medium, such as a sheet, by discharging ink supplied from an ink tank out of its print head. The printing unit 612 may be configured to be capable of performing other print processing, such as electrophotographic print processing. The print control unit 614 can read information about the printing unit 612 on a regular basis, and update status information stored in the RAM 604, including the remaining ink level of the ink tank and the state of the print head.

The wireless combination unit 616 is a unit that can provide the WLAN and Bluetooth® wireless functions. For example, the wireless combination unit 616 can provide functions similar to those of the combination of the WLAN unit 201 and the Bluetooth® unit 205 of the terminal apparatus 200. More specifically, the wireless combination unit 616 converts data into packets, transmits the packets to other devices, reconstructs original data from packets from the other devices outside, and outputs the original data to the CPU 602, based on the WLAN and Bluetooth® standards. The terminal apparatus 200 and the MFP 300 can perform P2P (WLAN) communication based on WFD, and the wireless combination unit 616 has a software access point (software AP) function or a group owner function. In other words, the wireless combination unit 616 can construct a P2P communication network and determine a channel to be used for the P2P communication.

(P2P Communication Method)

Next, a P2P (WLAN) communication method by which the apparatuses directly wirelessly communicate by WLAN communication without an intervention of the external access point 400 will be overviewed. P2P (WLAN) communication can be implemented by a plurality of techniques. For example, the communication apparatuses can support a plurality of modes for P2P (WLAN) communication, and perform P2P (WLAN) communication by selectively using one of the plurality of modes.

In each mode, a searching communication apparatus searches for and discovers a to-be-searched communication apparatus (partner apparatus) by using a search signal for searching for a partner apparatus (such as a Probe Request frame and a beacon). In searching for the partner apparatus, the searching communication apparatus and the to-be-searched communication apparatus use the same frequency band and the same communication method. For example, a description will be given of a case where the communication apparatuses can perform communication in (1) the P2P (WLAN) mode in the 2.4-GHz frequency band, (2) the P2P (Bluetooth®) mode in the 2.4-GHz frequency band, and (3) the P2P (WLAN) mode in the 5-GHz frequency band. The user can set the MFP 300 to operate in a desired one of the P2P modes. For example, in a case where the user sets the MFP 300 to operate in the P2P (WLAN) mode in the 2.4-GHz frequency band, the MFP 300 is unable to receive a search signal in the 5-GHz band if the searching communication apparatus such as the terminal apparatus 200 transmits a search signal in the 5-GHz band. Thus, the MFP 300 will not transmit a response signal for the search signal. For example, in a case where the user sets the MFP 300 to operate in the P2P (Bluetooth®) mode in the 2.4-GHz band and disables the P2P (WLAN) mode in the 2.4-GHz band, the MFP 300 is unable to recognize a search signal if the searching communication apparatus such as the terminal apparatus 200 transmits a search signal that is in the same 2.4-GHz band but is a WLAN search signal. Thus, the MFP 300 will not transmit a response signal. The searching communication apparatus can discover a to-be-searched partner apparatus that uses the same frequency band and the same communication method in such a manner.

There are four possible P2P modes:
Mode A (software AP mode)
Mode B (Wi-Fi Direct (WFD) mode)
Mode D (Bluetooth® Low Energy mode)
Mode E (Bluetooth® Classic mode)

Communication apparatuses capable of P2P communication can be configured to support at least one of the modes. In the present exemplary embodiment, mode A and mode B may be referred to collectively as P2P (WLAN), and mode D and mode E as P2P (Bluetooth®). Communication apparatuses capable of P2P communication do not necessarily support all the modes and may be configured to support only some of the modes. The communication apparatuses can also support the wireless infrastructure mode (mode C) aside from the P2P modes.

A communication apparatus having the WFD and Bluetooth® communication functions (such as the terminal apparatus 200) accepts user operations via its operation unit and calls an application (in some cases, dedicated one) for implementing the communication functions. The communication apparatus then displays a screen provided by the application to prompt user operations, and implements WFD communication and Bluetooth® communication based on the user operations accepted. As employed here, Bluetooth® communication refers to communication using Bluetooth® 1.1 to 5.0, such as Bluetooth® Classic and Bluetooth® Low Energy.

Next, sequences (device search sequences) for searching a partner apparatus in the foregoing four P2P modes will be described.

Device Search Sequence in Mode A (Software AP Mode)

Figure 7:
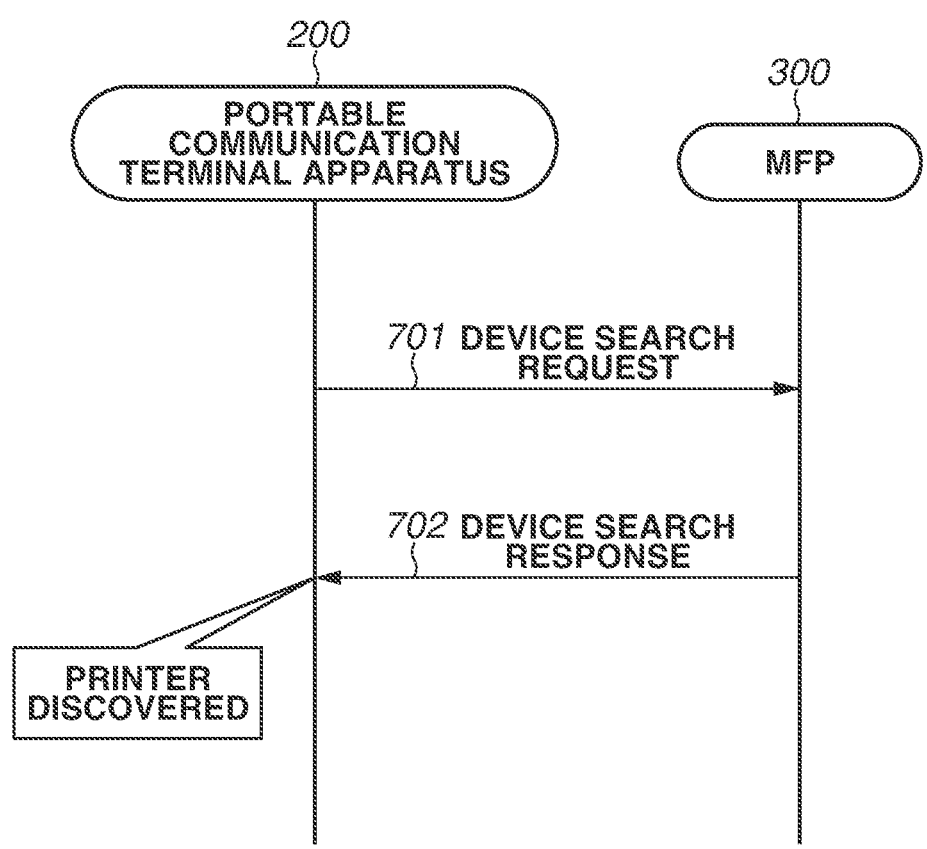
FIG. 7 is a sequence diagram illustrating an example of a device search sequence in mode A (software access point (AP) mode).

FIG. 7 illustrates the device search sequence in mode A (software AP mode). In the software AP mode, a communication apparatus (for example, the terminal apparatus 200) operates as a client that requests various services. The other communication apparatus (for example, the MFP 300) operates as a software AP that can perform the WLAN AP function based on software settings. In the software AP mode, the communication apparatus operating as the client transmits a device search request 701 to search for the communication apparatus operating as the software AP. The software AP receives the device search request 701, and transmits a device search response 702 as a response. The communication apparatus (for example, terminal apparatus 200) operating as the client discovers the partner apparatus (for example, MFP 300) operating as the software AP, by the transmission and reception of a device search request and a device search response like this. Since the commands and parameters transmitted and received in establishing the wireless connection between the client and the software AP can be those defined in the Wi-Fi (registered trademark) standard, a description thereof will be omitted here. As a master station, the MFP 300 operating in the software AP mode determines the frequency band and the frequency channel. The MFP 300 can thus select which frequency band to use, the 5-GHz band or the 2.4-GHz band, and which frequency channel to use in the selected frequency band.

Device Search Sequence in Mode B (WFD Mode)

Figure 8:
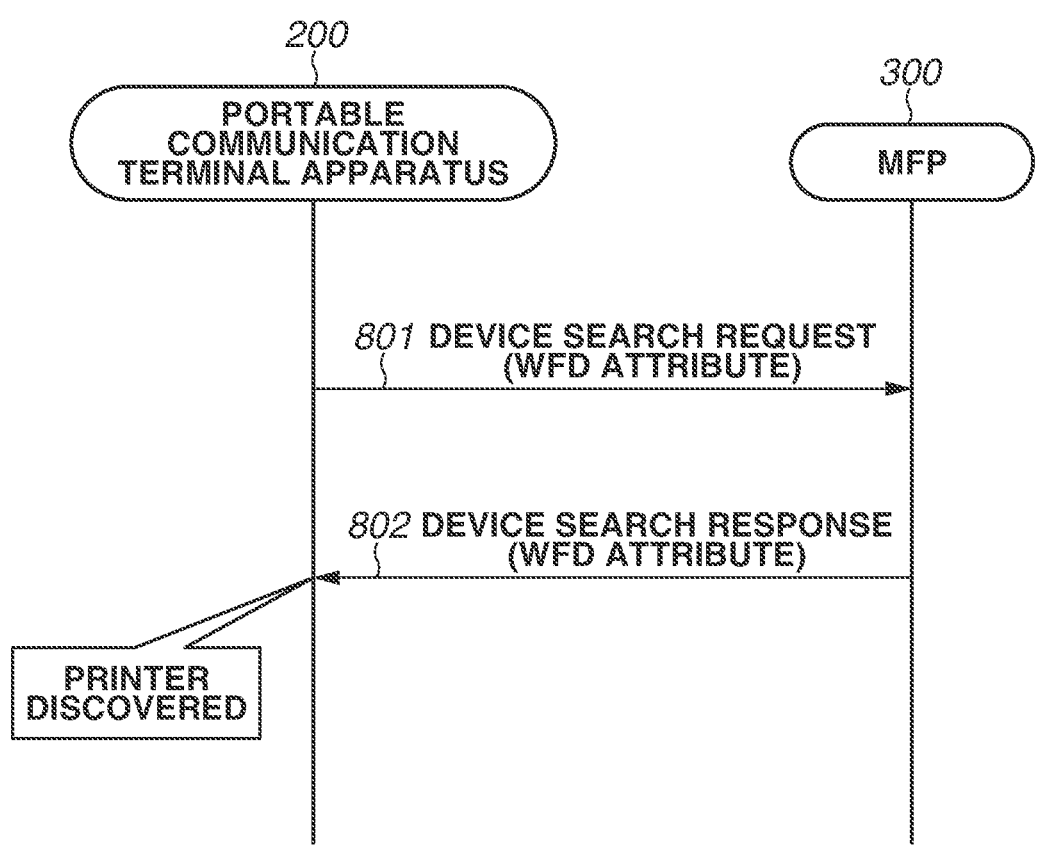
FIG. 8 is a sequence diagram illustrating an example of a device search sequence in mode B (Wi-Fi Direct (WFD) mode).

FIG. 8 illustrates the device search sequence in mode B (WFD mode). In the WFD mode, the searching communication apparatus searches for the to-be-searched partner apparatus by transmitting a device search request 801. In the present exemplary embodiment, the searching communication apparatus is the terminal apparatus 200 and the to-be-searched partner apparatus is the MFP 300. The device search request 801 has a WFD attribute, whereby the search target is specified to be a communication apparatus in the WFD mode. In a case where the MFP 300 operating in the WFD mode receives the device search request 801, the MFP 300 transmits a device search response 802 to the terminal apparatus 200 as a response. In case where the terminal apparatus 200 receives the device search response 802, the terminal apparatus 200 detects the MFP 300 that is the P2P communication partner. After the completion of the device search, the communication apparatuses determine the roles of the P2P group owner (GO) and the P2P client, and perform the rest of the wireless connection processing. The role determination corresponds to GO Negotiation in WFD. The MFP 300 may be activated as a master station in the WFD mode in a fixed manner (Autonomous Group Owner). In such a case, the GO Negotiation processing for determining the roles is not needed. Moreover, in such a case, the MFP 300 determines, as the master station, the frequency band and the frequency channel. The MFP 300 can thus select which frequency band to use, the 5-GHz band or the 2.4-GHz band, and which frequency channel to use in the frequency band.

Device Search Sequence in Mode D (Bluetooth® Low Energy Mode)

Figure 10:
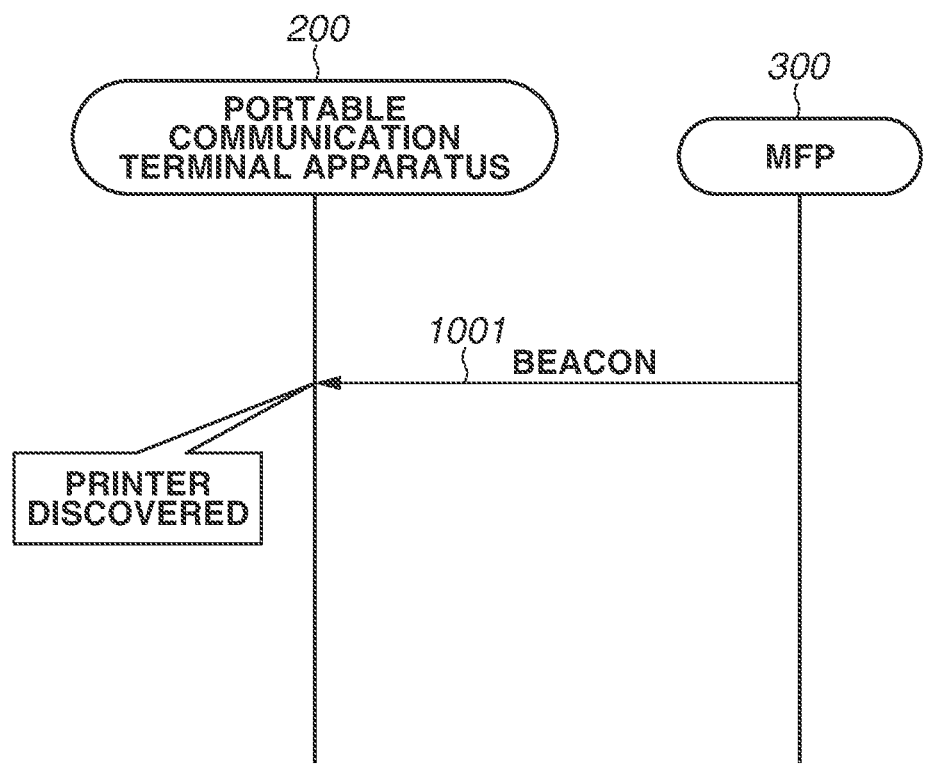
FIG. 10 is a sequence diagram illustrating an example of a device search sequence in mode D (Bluetooth® Low Energy mode).

FIG. 10 illustrates the device search sequence in mode D (Bluetooth® Low Energy mode). In the Bluetooth® Low Energy mode, a communication apparatus transmits (broadcasts) a beacon 1001 (Advertising data (such as an Advertising protocol data unit (PDU))). The other communication apparatus can recognize the presence of the communication apparatus by receiving the beacon 1001. For example, in a case where the MFP 300 transmits the beacon 1001, the terminal apparatus 200 can recognize the presence of the MFP 300 by receiving the beacon 1001. To obtain additional information after the reception of the beacon 1001, the terminal apparatus 200 transmits a scan request to the MFP 300. The MFP 300 can transmit a scan response in response to the scan request. The MFP 300 and the terminal apparatus 200 can communicate in the Bluetooth® Low Energy based P2P (Bluetooth®) mode by using the Generic Attribute Profile (GATT). Since the commands and parameters for communication can be those defined in the Bluetooth® 4.1 standard, a description thereof will be omitted here. In FIG. 10, the MFP 300 operates as a slave, and the terminal apparatus 200 as a master.

Device Search Sequence in Mode E (Bluetooth® Mode)

Figure 11:
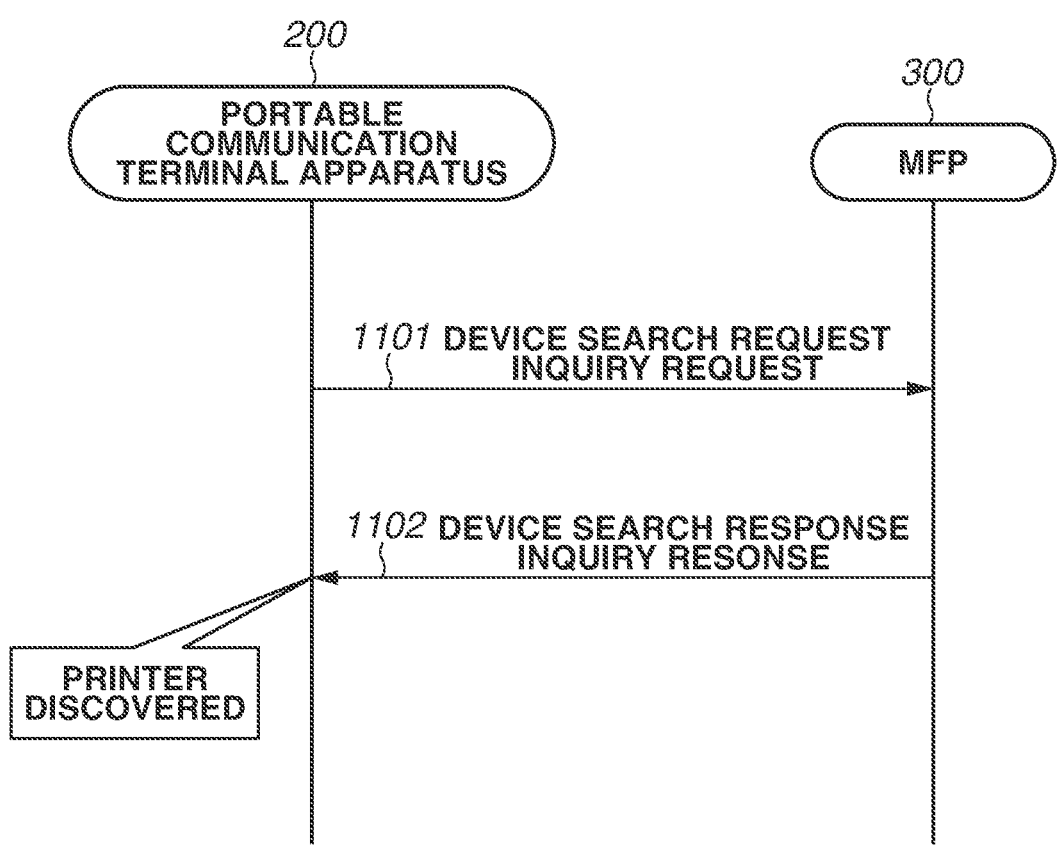
FIG. 11 is a sequence diagram illustrating an example of a device search sequence in mode E (Bluetooth® mode).

FIG. 11 illustrates the device search sequence in mode E (Bluetooth® mode). In the Bluetooth® mode, one communication apparatus operates as a master for searching for a Bluetooth® device, and the other communication apparatus as a slave. In the present exemplary embodiment, for example, the terminal apparatus 200 operates as a master here, and the MFP 300 operates as a slave. The terminal apparatus 200 (master) searches for the partner apparatus by transmitting a device search request 1101. In a case where the MFP 300 (slave) receives the device search request 1101, the MFP 300 transmits a device search response 1102 as a response signal. Since the connection and transmission/reception procedures using the commands and parameters including the device search request 1101 and the device search response 1102 are defined in the Bluetooth® 1.1 standard and its variations, a description thereof will be omitted here.

(Wireless Infrastructure Mode)

Figure 9:
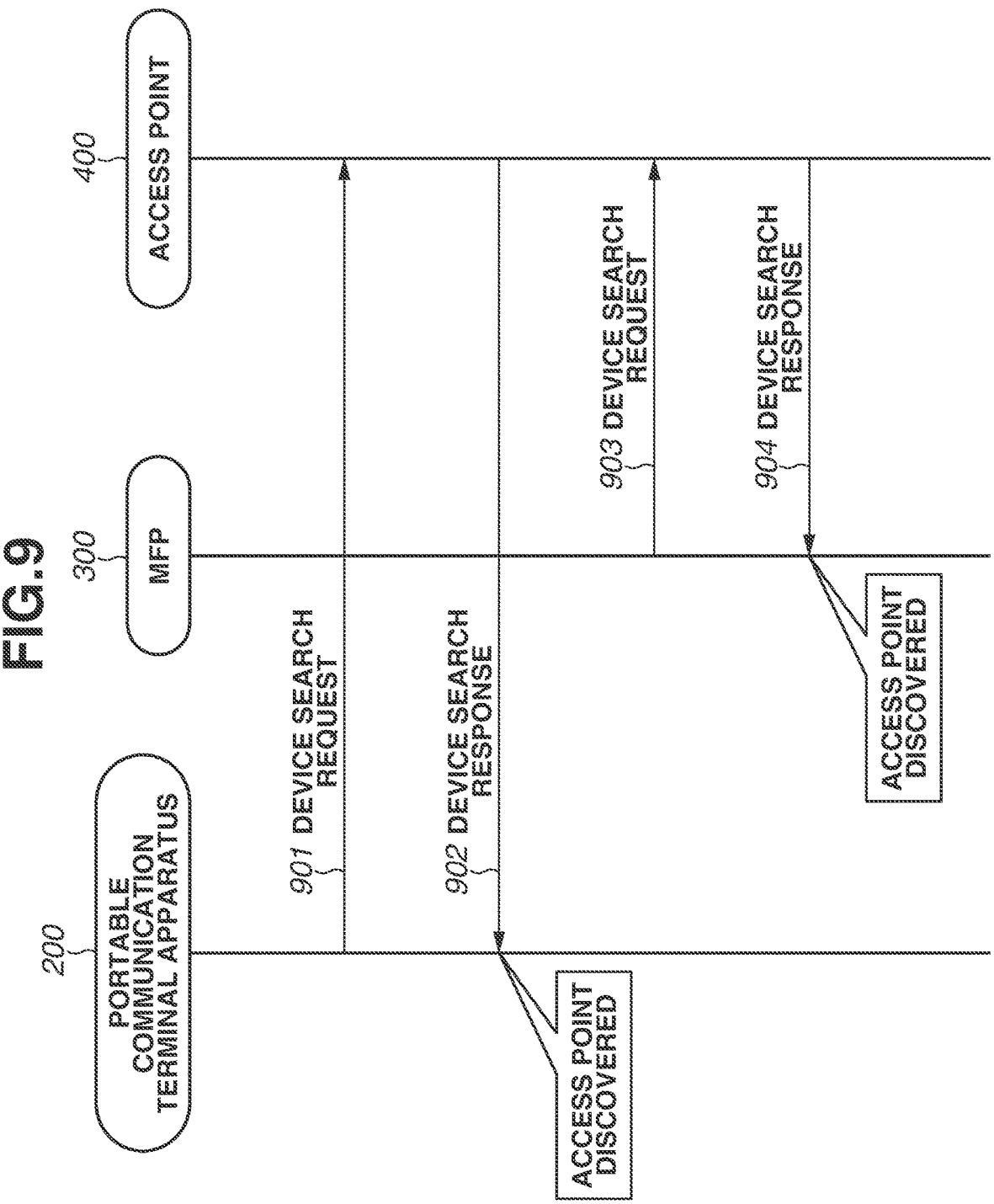
FIG. 9 is a sequence diagram illustrating an example of a device search sequence in mode C (wireless infrastructure mode).

FIG. 9 is a diagram illustrating a device search sequence in mode C (wireless infrastructure mode). In the wireless infrastructure mode, communication apparatuses to communicate with each other (for example, the terminal apparatus 200 and the MFP 300) are connected to an external AP governing a network (for example, the access point 400), and the communication apparatuses communicate with each other via the AP. In other words, the communication apparatuses communicate via the network constructed by the external AP. In the wireless infrastructure mode, for example, the terminal apparatus 200 searches for the access point 400 by transmitting a device search request (Probe Request) 901. The access point 400 transmits a device search response (Probe Response) 902 in response to the device search request 901. The terminal apparatus 200 discovers the access point 400 by receiving the device search response 902, and displays a service set identifier (SSID) included in the Probe Response. Similarly, the MFP 300 also discovers the access point 400 by transmitting a device search request 903 and receiving a device search response 904, and displays the SSID included in the Probe Response. The terminal apparatus 200 and the MFP 300 each discover the access point 400, transmit a connection request to the access point 400, and connect to the access point 400, whereby the communication between the communication apparatuses in the wireless infrastructure mode via the access point 400 is enabled. Alternatively, the plurality of communication apparatuses may connect to respective different APs. In such a case, the communication between the communication apparatuses is enabled by data transfer between the APs. Since the commands and parameters transmitted and received in performing communication between the communication apparatuses via the access point(s) can be those defined in the Wi-Fi standards, a description thereof will be omitted here. In the wireless infrastructure mode, the access point 400 determines the frequency band and the frequency channel. The access point 400 can thus select which frequency band to use, the 5-GHz band or the 2.4-GHz band, and which frequency channel to use in the frequency band.

(Summary of Processing)

In a case where a communication apparatus operates in a plurality of wireless communication modes in parallel, convenience can be decreased. For example, in a case where a CPU and a set of antennas are used to enable connections in a plurality of wireless communication modes in parallel, convenience can be decreased due to insufficient communication times in the wireless communication modes used for data communication. A set of antennas may refer to, for example, a single antenna or a set of array antennas. In a case where, for example, the MFP 300 including the wireless combination unit 616 as described above operates in a plurality of communication modes such as the wireless infrastructure mode and the P2P (WLAN) mode in parallel, communication intervals and communication speeds can thus be unstable depending on the operation state. In the present exemplary embodiment, the wireless combination unit 616 of the MFP 300 will be described to include a single antenna. The communications in the wireless infrastructure mode, the P2P (WLAN) mode, and the P2P (Bluetooth®) mode are performed by using the single antenna. Note that performing communications in such communication modes using a single antenna is just an example. A plurality of antennas may be used, and communication modes different from the foregoing may be performed. All the three modes do not need to be performed, either.

In the present exemplary embodiment, processing for increasing the communication stability in the case where a communication apparatus is set to use a plurality of wireless communication modes in parallel is performed. Specifically, in a case where a plurality of wireless communication modes is enabled, the MFP 300 according to the present exemplary embodiment controls operation in a time division manner. The MFP 300 then performs control to change ratios of durations of communication using the respective wireless communication modes per unit time, based on connection states in the plurality of wireless communication modes enabled. Time division control based on the connection states will now be described. The user can individually enable the WLAN wireless infrastructure mode, the P2P (WLAN) mode, and the Bluetooth® Low Energy mode by using the screen of FIG. 4C, for example. Based on such operations, the MFP 300 can maintain the wireless connection in the wireless infrastructure mode for enabling wireless communication with the communication partner apparatus via the external access point 400 and the P2P (WLAN) mode without the intervention of the external access point 400 in parallel. During the communication in the P2P (WLAN) mode according to the present exemplary embodiment, the MFP 300 itself functions as a master station.

(Time Division Control Based on Connection States)

The wireless combination unit 616 of the MFP 300 is capable of, for example, WLAN communication compliant with the IEEE 802.11 standard series in the 2.4- and 5-GHz bands, and also capable of communication compliant with the Bluetooth® Low Energy standard of Bluetooth® 4.1 or later. Examples of possible WLAN connection states of the MFP 300 using the wireless combination unit 616 include a "standby state", a "wireless infrastructure connection state", a "P2P connection state", and a "wireless infrastructure connection and P2P connection state".

The "standby state" refers to a state where the MFP 300 is powered on, the wireless infrastructure mode and the P2P (WLAN) mode are enabled, and a connection request can be accepted. In this state, however, the MFP 300 is not actually performing connection processing with an external AP (for example, the access point 400) or an external apparatus (for example, the terminal apparatus 200). In other words, the "standby state" refers to a state where a plurality of communication modes is enabled and the communication partner apparatuses in the respective communication modes are yet to be determined.

The "wireless infrastructure connection state" refers to a state where the MFP 300 is powered on, the wireless infrastructure mode and the P2P (WLAN) mode are enabled, and the external access point 400 is set as a connection partner. In this mode, however, the communication partner apparatus in the P2P (WLAN) mode is yet to be determined. The "P2P connection state" refers to a state where the MFP 300 is powered on, the wireless infrastructure mode and the P2P (WLAN) mode are enabled, and the connection processing with the terminal apparatus 200 that is the connection partner in the P2P (WLAN) mode is completed. In this mode, however, the connection partner apparatus in the wireless infrastructure mode is yet to be determined. The "wireless infrastructure connection and P2P connection state" refers to a state where both the wireless communication modes are enabled and both the connection partner apparatuses are determined.

The MFP 300 performs data communication by wireless communication in the WLAN wireless infrastructure mode or wireless communication in the P2P (WLAN) mode, using the wireless combination unit 616. The MFP 300 can enable the WLAN wireless infrastructure mode and the P2P (WLAN) mode in parallel. The CPU 602 determines which of the two modes, the wireless infrastructure mode or the P2P (WLAN) mode, uses more wireless resources in the data communication, based on the connection states (for example, presence or absence of the communication partner apparatuses). Based on the determination, the CPU 602 then determines durations to be assigned to the respective modes per unit time.

<Startup Settings>

The MFP 300 is configured to start a processing sequence that is dedicated for initial activation time (initial setup) and different from usual to perform initial settings in a factory shipment state (delivery state), when the user powers on the MFP 300 for the first time after purchase. For example, the MFP 300 is shipped from the factory without an ink tank or a print head attached to the printing unit 612. Immediately after the initial activation which is the initial operation by the user, the MFP 300 thus executes preparatory operations, such as prompting the user to attach an accompanying ink tank and print head, to make the MFP 300 usable. Whether the MFP 300 is still in the factory shipment state, i.e., an initial activation state, is determined by using a flag (initial activation flag) stored in the nonvolatile memory 605. The state of the initial activation flag is changed by the completion of the preparatory operations. After the completion of the preparatory operations, the MFP 300 controls the processing sequence dedicated for the initial activation time to not be activated.

Figure 13:
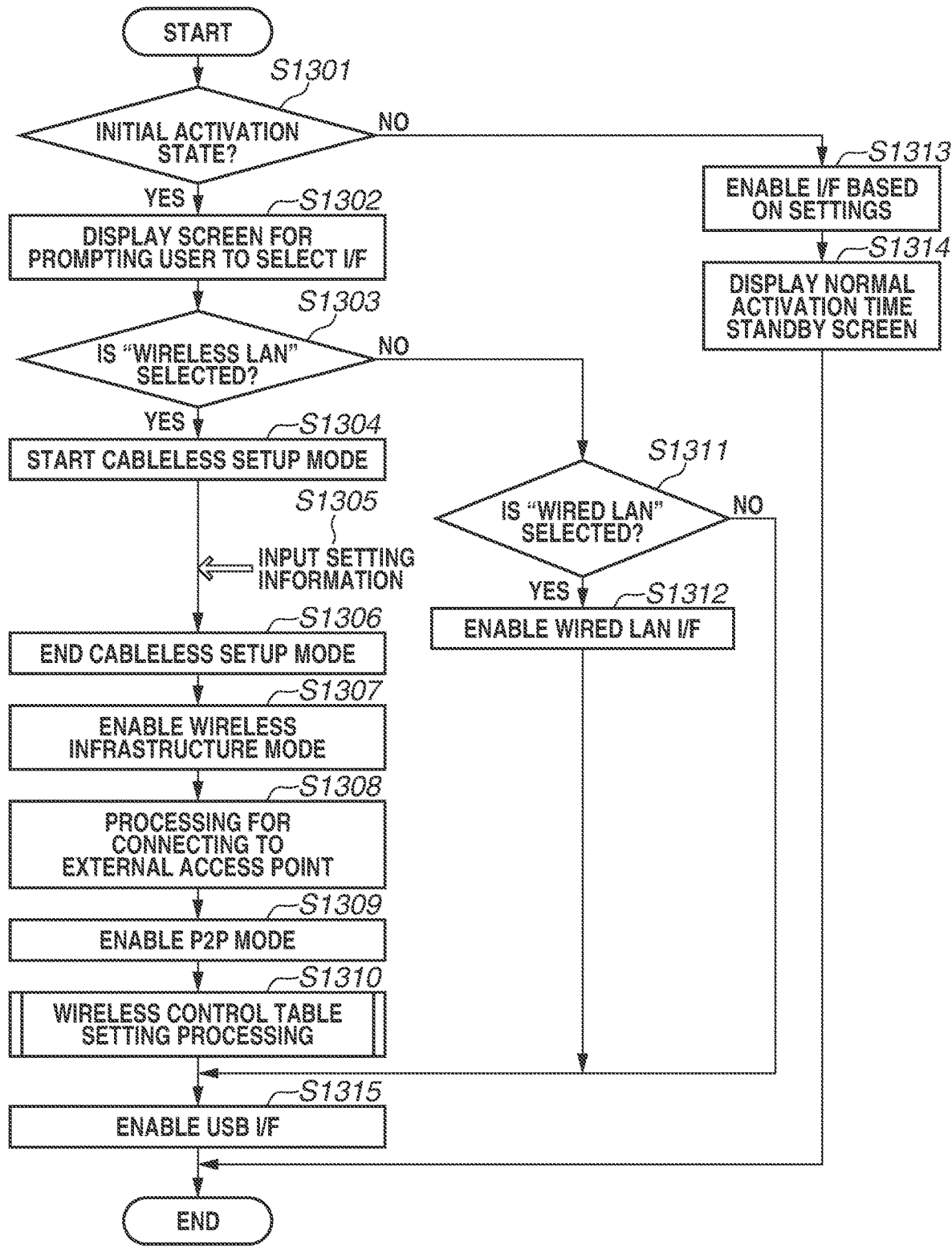
FIG. 13 is a flowchart illustrating an example of a procedure of interface processing upon initial activation.

In the present exemplary embodiment, taking it into account that specific processing is performed upon the initial activation of the MFP 300, communication modes are set during the processing upon the initial activation. The processing for setting the communication modes upon the initial activation of the MFP 300 will be described with reference to FIGS. 12 and 13. While initial setup sequences other than the setting of the communication modes are also performed upon the initial activation, a description of the sequences not directly related to the present exemplary embodiment will be omitted here. The processing procedure performed by the MFP 300 will be described with reference to the flowchart of FIG. 13. The processing of the steps in the flowchart according to the present exemplary embodiment is implemented, for example, by the CPU 602 reading a program stored in the ROM 603 and executing the program.

In step S1301, the MFP 300 powered on refers to the initial activation flag stored in the nonvolatile memory 605, and determines whether the own apparatus is in the initial activation state. When the MFP 300 is shipped from the factory, the initial activation flag is set to a specific value indicating the initial activation state. In a case where the MFP 300 determines that the own apparatus is not in the initial activation state (NO in step S1301), the processing proceeds to step S1313. In step S1313, the MFP 300 enables an I/F (also referred to as a communication mode) set to be enabled, based on settings stored in the nonvolatile memory 605. In step S1314, the MFP 300 displays a normal activation time standby screen like the screen illustrated in FIG. 4A, and enters a state of waiting for user operations. Then, the processing ends. The processing of steps S1313 and S1314 corresponds to activation processing for normal use of the MFP 300. The normal use corresponds to the state the case where the MFP 300 is used after the completion of the initial setup. On the other hand, In a case where the MFP 300 determines that the own apparatus is in the initial activation state (YES in step S1301), the processing proceeds to step S1302 to perform a processing sequence for the case where the user activates the MFP 300 for the first time, illustrated in steps S1302 to S1315. In this processing sequence, in step S1302, the MFP 300 initially displays a screen for prompting the user to select an I/F to be used on the MFP 300, such as illustrated in FIG. 12, on the operation display unit 305. The user selects the I/F to be used on the MFP 300 from among the items displayed on the screen. In step S1303, the MFP 300 determines whether "wireless LAN" is selected by a user operation. In a case where the MFP 300 determines that "wireless LAN" is not selected (NO in step S1303), the processing proceeds to step S1311. In step S1311, the MFP 300 determines whether "wired LAN" is selected by a user operation. In a case where the MFP 300 determines that "wired LAN" is selected (YES in step in step S1311), the processing proceeds to step S1312. In step S1312, the MFP 300 performs processing for enabling a wired LAN I/F. The processing proceeds to step S1315. In addition, the MFP 300 stores setting information indicating that the wired LAN I/F is enabled into the nonvolatile memory 605. This enables the MFP 300, when normally activated (NO in step S1301), to refer to the setting information and enable the wired LAN I/F (step S1313). In a case where the MFP 300 determines that "wired LAN" is not selected, either (NO in step S1311), the processing proceeds to step S1315. The case where the processing proceeds from step S1311 to step S1315 without performing the processing of step S1312 refers to where "USB" (Universal Serial Bus) is selected, not "wireless LAN" or "wired LAN". In such a case, in step S1315, the MFP 300 enables a USB I/F, and ends the I/F setting processing upon the initial activation. Although not illustrated in the diagram, when delivery processing sequences including the I/F selection are all completed, the MFP 300 changes the value of the initial activation flag stored in the nonvolatile memory 605 from the value indicating the initial activation state to a value indicating a non-initial activation state. The non-initial activation state corresponds to the state during the normal use described above. This prevents the initial activation processing sequence from being activated when the MFP 300 is powered on at next timing.

Return to step S1303. In a case where the MFP 300 determines that "wireless LAN" is selected by a user operation (YES in step S1303), the processing proceeds to step S1304. In step S1304, the MFP 300 activates a cableless setup mode. The cableless setup mode is a mode dedicated for wireless settings. In the cableless setup mode, the MFP 300 activates the wireless combination unit 616 in the software AP mode and operates the wireless combination unit 616 as a master station. The software AP activated at this timing is a master station intended for the cableless setup mode. External communication apparatuses, such as a PC, a smartphone, and a tablet, can thus connect to and communicate with the MFP 300 as clients (slave units). During the cableless setup, either the 2.4- or 5-GHz frequency band is used. Which of the frequency bands to use may be determined, for example, by the MFP 300, based on wireless communication conditions nearby. For example, in a case where the MFP 300 determines that wireless communication using the 2.4-GHz band is more congested than wireless communication using the 5-GHz band, the MFP 300 may operate the wireless combination unit 616 as a software AP for performing communication using the 5-GHz band. The cableless setup mode is not limited to the use of the software AP mode. For example, the WFD mode may be used instead of the software AP mode. The software AP mode is used here because the use of WFD involves including a randomly generated character string into the SSID, the network identifier, while the software AP is free from such a restriction. In the present exemplary embodiment, the terminal apparatus 200 establishes a P2P (WLAN) wireless connection compliant with the IEEE 802.11 series with the wireless combination unit 616 of the MFP 300 activated as a software AP in step S1304.

In the cableless setup mode, in step S1305, the MFP 300 accepts input of setting information mainly used to establish a connection in the wireless infrastructure mode. The external communication apparatus, such as a PC, a smartphone, and a tablet, establishes a P2P (WLAN) wireless connection with the wireless combination unit 616 of the MFP 300, and then transmits setting information for the wireless infrastructure mode. For example, the MFP 300 identifies SSIDs to which the own apparatus can connect, generates an SSID list, and transmits the SSID list to the external communication apparatus via the P2P (WLAN) wireless connection. The external communication apparatus then displays the SSID list by using a dedicated LAN setting application, and transmits an SSID selected by the user and a password to be used to connect to the SSID to the MFP 300 as setting information via the P2P (WLAN) wireless connection. The dedicated LAN setting application running on the external communication apparatus, such as a PC, a smartphone, and a tablet, is configured so that the MFP 300 can be connected to an external AP to which the external communication apparatus is connected. The setting information may be input using a different method other than user specification. For example, the dedicated LAN setting application running on the terminal apparatus 200 determines whether wireless setting information about the external AP to which the terminal apparatus 200 is connected is included in the received SSID list. In a case where the terminal apparatus 200 determines that the wireless setting information is included, the wireless setting information about the external AP to which the terminal apparatus 200 is connected may be automatically transmitted via the P2P (WLAN) wireless connection with the wireless combination unit 616 of the MFP 300 operating as the software AP. The dedicated LAN setting application can be activated, for example, by the external communication apparatus executing a program stored in a storage medium packaged with the product of the MFP 300 or distributed in a form downloadable over a network. In the present exemplary embodiment, the setting information for the wireless infrastructure mode is described to be accepted in step S1305. However, in step S1305, an instruction to operate in the P2P (WLAN) mode may be given. In a case where such an instruction is given, the MFP 300 ends the cableless setup mode as in step S1306 to be described below, terminates the software AP mode intended for the cableless setup mode as well, and activates a software AP serving as a new master station. The software AP activated here is the same as that in step S1309. Thus, in a case where the software AP is activated here, the processing of step S1309 may be omitted.

The setting information that the MFP 300 receives from the external communication apparatus in step S1305 includes the SSID of the external AP constructing the network to be joined, and a frequency band, an encryption method, and an authentication method used by the external AP. The information about the frequency band can include information specifying the 5- or 2.4-GHz band, or a value indicating a wireless channel related to the frequency band. In step S1306, in response to receiving the setting information, the MFP 300 ends the cableless setup mode to terminate the software AP mode. In step S1307, the MFP 300 performs processing for enabling the wireless infrastructure mode. In step S1308, the MFP 300 starts communication in the wireless infrastructure mode using setting values, based on the setting information received in step S1305, and performs processing for connecting to the external access point 400. In response to enabling the wireless infrastructure mode, the MFP 300 stores the setting information into the nonvolatile memory 605. Specifically, information indicating that the wireless infrastructure mode is enabled and the SSID of the external AP used in the wireless infrastructure mode are stored. In step S1309, the MFP 300 enables the setting of the P2P (WLAN) mode. In step S1309, the MFP 300 activates the wireless combination unit 616 in the software AP mode and operates the wireless combination unit 616 as a master station (software AP). The software AP activated here uses an SS ID different from that of the software AP in the foregoing cableless setup mode. The wireless combination unit 616 is not limited to be activated as a software AP and may be activated as a Wi-Fi Direct group owner. In response to enabling the P2P (WLAN) mode, the MFP 300 then stores the settings into the nonvolatile memory 605. Specifically, information indicating that the P2P (WLAN) mode is enabled and the frequency band and channel (CH) information used in the P2P (WLAN) mode are stored. The P2P (WLAN) mode can also be enabled even in a case where the MFP 300 can operate in the wireless infrastructure mode and the P2P (WLAN) mode in parallel and only the wireless infrastructure mode is selected by the user in the setup procedure upon the initial activation. The MFP 300 then can automatically perform a setup so that the MFP 300 operates in the wireless infrastructure mode and the P2P (WLAN) mode in parallel. In other words, the processing for enabling the P2P (WLAN) mode and storing the settings may be performed regardless of whether the instruction to enable the P2P (WLAN) mode is received in step S1305. In such a case, the frequency bands and CHs suitable for the region where the wireless LAN is used can be stored in the MFP 300 as initial values in advance.

Figure 19:
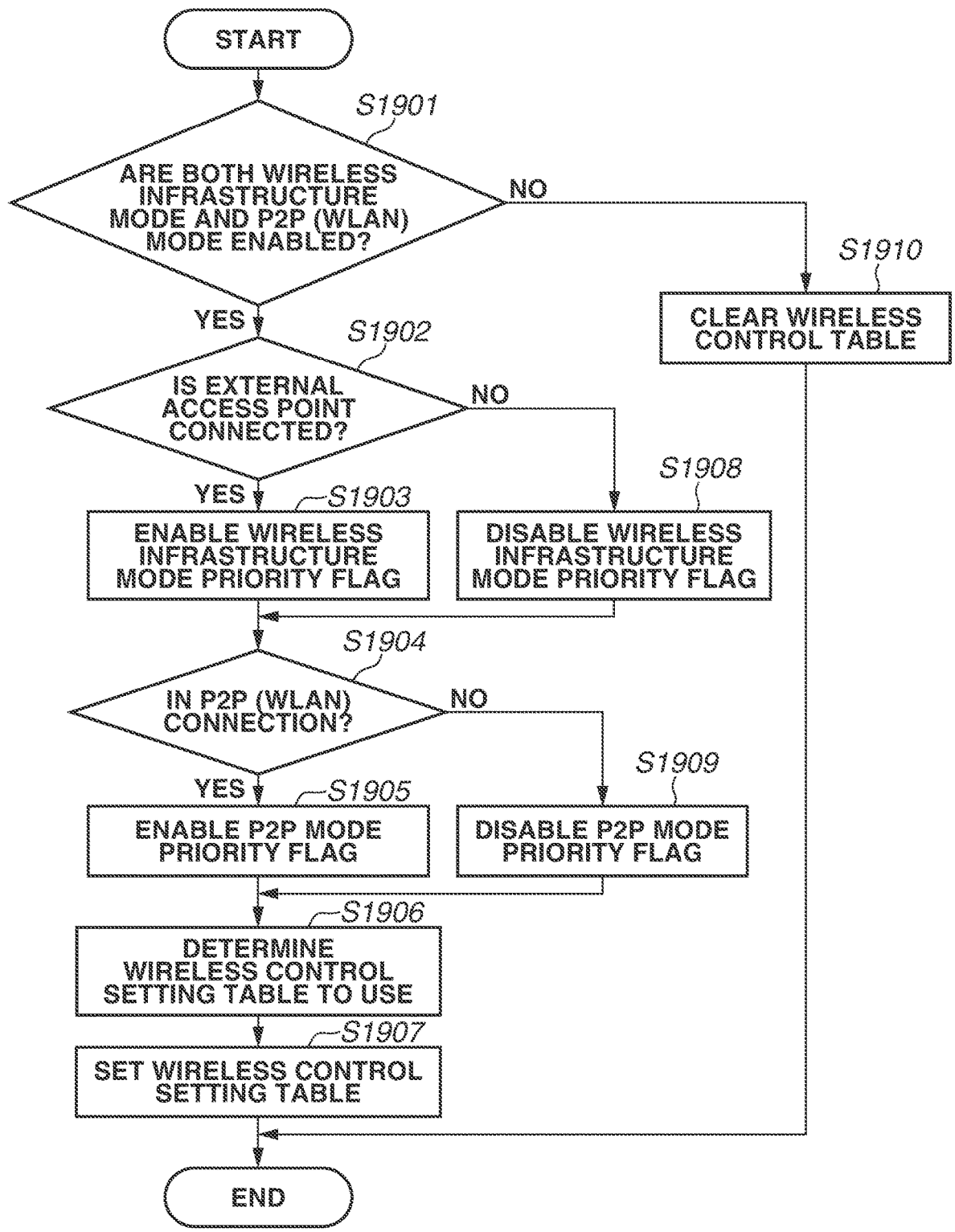
FIG. 19 is a flowchart illustrating an example of a procedure of processing for selecting and setting a wireless control setting table.

As described above, the wireless combination unit 616 performs communication in a plurality of communication modes by using the common antenna. To perform stable communication in a plurality of communication modes by using the common antenna, the MFP 300 sets the priorities of the respective communication modes, and sets the durations to be assigned by time division control based on the priorities. In step S1310, the MFP 300 sets a wireless control table to set the durations. Details of wireless control table setting processing performed in step S1310 will be described with reference to FIG. 19. In step S1310, the MFP 300 performs processing for selecting a table to be used from among ones illustrated in FIGS. 20A, 20B, 20C, and 20D, which are stored in the nonvolatile memory 605 in advance.

In step S1901, the MFP 300 determines whether both the wireless infrastructure mode and the P2P (WLAN) mode are enabled.

In a case where both the wireless infrastructure mode and the P2P (WLAN) mode are determined to not be enabled (NO in step S1901), the processing proceeds to step S1910. In step S1910, the MFP 300 performs clear processing on the settings in a wireless control table stored in the nonvolatile memory 605. Then, the processing ends. In the present exemplary embodiment, in a case where the determination of step S1303 is YES, both the wireless infrastructure mode and the P2P (WLAN) mode are enabled in steps S1307 and S1309. On the other hand, in a case where the determination of step S1303 is NO, both the wireless infrastructure mode and the P2P (WLAN) mode are disabled. In the present exemplary embodiment, the state of the MFP 300 in making the determination of step S1901 is basically either that both the wireless infrastructure mode and the P2P (WLAN) mode are enabled or that both are disabled. In such a case, the clear processing of step S1910 works fine. By contrast, in a case where either one of the wireless infrastructure mode and the P2P (WLAN) mode is enabled, then in step S1910, the MFP 300 may set the occupancy of the enabled mode to 100%.

In a case where the MFP 300 determines that both the wireless infrastructure mode and the P2P (WLAN) mode are enabled (YES in step S1901), the processing proceeds to step S1902. In step S1902, the MFP 300 determines whether any external access point is connected. For example, the MFP 300 performs connection processing with an external access point by using the SSID for the wireless infrastructure mode received in the foregoing processing in the cableless setup mode. When the connection processing is completed, information indicating the completion of the connection is stored in the nonvolatile memory 605. In step S1902, the MFP 300 refers to this information to determine whether any external access point is connected. Alternatively, for example, the MFP 300 may make the determination of step S1902, based on whether an SSID for the wireless infrastructure mode is set. The MFP 300 may make the determination of step S1902, based on whether an Internet Protocol (IP) address is assigned to the MFP 300 by an external access point that is a master station in the wireless infrastructure mode. In other words, the MFP 300 may make the determination of step S1902, based on whether an external access point to be a communication partner apparatus is determined. The SSID that is used in the wireless infrastructure mode may be set by a different method other than in the cableless setup mode. In a case where no external access point is determined to be connected (NO in step S1902), the processing proceeds to step S1908. In step S1908, the MFP 300 disables a wireless infrastructure mode priority flag, and stores the information into the nonvolatile memory 605.

On the other hand, in a case where the MFP 300 determines that an external access point is connected (YES in step S1902), the processing proceeds to step S1903. In step S1903, the MFP 300 enables the wireless infrastructure mode priority flag, and stores the information into the nonvolatile memory 605.

In step S1904, the MFP 300 determines whether the MFP 300 is in P2P (WLAN) connection with an external communication apparatus. In response to Receiving a P2P (WLAN) connection request, the MFP 300 performs connection processing, and counts up the number of connections by one upon completion of the connection processing.

In a case where the number of connections is one or more, then in step S1904, the MFP 300 determines that the MFP 300 is in P2P (WLAN) connection. Alternatively, for example, the MFP 300 may make the determination of step S1904, based on whether identification information (such as an IP address and an apparatus name) about a communication partner apparatus (for example, the terminal apparatus 200) to be the partner of the P2P (WLAN) connection is stored. In other words, the determination of step S1904 may be made, based on whether the communication partner apparatus of the P2P (WLAN) connection is determined. In a case where the MFP 300 is determined to not be in P2P (WLAN) connection with an external communication apparatus (NO in step S1904), the processing proceeds to step S1909. In step S1909, the MFP 300 disables a P2P mode priority flag, and stores the information into the nonvolatile memory 605.

On the other hand, in a case where the MFP 300 determines that the MFP 300 is in P2P (WLAN) connection with an external communication apparatus (YES in step S1904), the processing proceeds to step S1905. In step S1905, the MFP 300 enables the P2P mode priority flag, and stores the information into the nonvolatile memory 605.

In step S1906, the MFP 300 refers to the wireless infrastructure mode priority flag and the P2P mode priority flag, and determines which of the wireless control setting tables illustrated in FIGS. 20A, 20B, 20C, and 20D to use. More specifically, in a case where the wireless infrastructure mode priority flag is disabled and the P2P mode priority flag is disabled, the MFP 300 determines to use the wireless control setting table of FIG. 20A (standby table). In a case where the wireless infrastructure mode priority flag is enabled and the P2P mode priority flag is disabled, the MFP 300 determines to use the wireless control setting table of FIG. 20B (wireless infrastructure connection priority table). In a case where the wireless infrastructure mode priority flag is disabled and the P2P mode priority flag is enabled, the MFP 300 determines to use the wireless control setting table of FIG. 20C (P2P connection priority table). In a case where the wireless infrastructure mode priority flag is enabled and the P2P mode priority flag is enabled, the MFP 300 determines to use the wireless control setting table of FIG. 20D (full active table). The numerical values in the wireless control setting tables of FIGS. 20A, 20B, 20C, and 20D are just examples, and other values may be set.

In step S1907, the MFP 300 sets the wireless control setting table determined in step S1906 into a wireless chip driver. Communication performed by the MFP 300 in the cases where the wireless control setting tables of FIGS. 20A, 20B, 20C, and 20D are set into the wireless chip driver will be overviewed with reference to FIGS. 21A, 21B, 21C, and 21D, respectively. The wireless chip driver refers to a module for controlling the wireless combination unit 616.

FIGS. 21A, 21B, 21C, and 21D illustrate the outlines of the communication in the cases where the CPU 602 sets the wireless control setting tables of FIGS. 20A, 20B, 20C, and 20D into the wireless chip driver, respectively.

In FIGS. 21A to 21D, packets illustrated by white rectangles represent ones transmitted from the MFP 300. Packets illustrated by shaded rectangles represent ones received by the MFP 300. The horizontal axes indicate elapsed time. T in FIGS. 21A to 21D represents unit time. The lengths of unit time T in FIGS. 21A to 21D are the same.

Figure 21A:
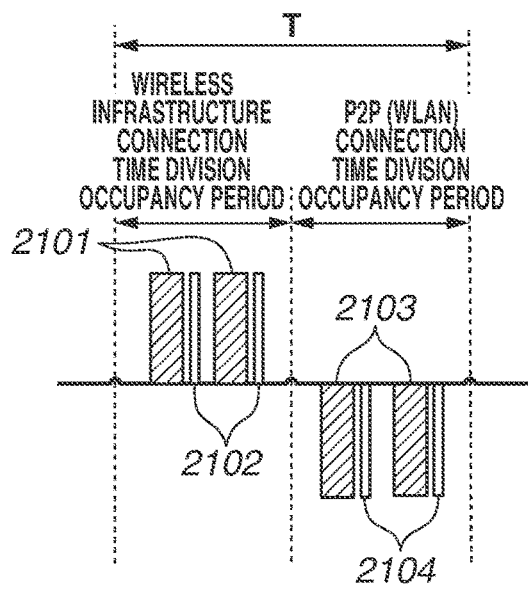
FIGS. 21A, 21B, 21C, and 21D are diagrams illustrating examples of communication periods set based on the respective wireless control setting tables.

FIG. 21A illustrates an operation example in the case where the standby table of FIG. 20A is set into the wireless chip driver. In other words, FIG. 21A illustrates an operation in the case where the MFP 300 is not connected to the external access point 400 and not in P2P (WLAN) connection with the external communication apparatus. As is clear from FIG. 21A, the MFP 300 performs communication so that a time division occupancy period of the wireless infrastructure connection and that of the P2P (WLAN) connection are substantially the same. In FIG. 21A, packets 2101 received by the MFP 300 are beacons output from the external access point 400. The beacons include the SSID corresponding to the external access point 400. In response to receiving the beacons, the MFP 300 transmits connection request packets 2102 based on user operations on the MFP 300. For example, the MFP 300 receives a beacon (connection request packet 2101) output from the external access point 400 with an SSID in a 5-GHz dynamic frequency selection (DFS) band, and displays the SSID included in the beacon (connection request packet 2101). In a case where the user selects the SSID in the 5-GHz DFS band to accept the connection instruction, a connection request packet 2102 is transmitted. Packets 2103 received by the MFP 300 are ones for P2P (WLAN) connection. Examples include a Probe Request. In a case where the packets 2103 are a Probe Request, packets 2104 are a Probe Response.

Figure 21B:
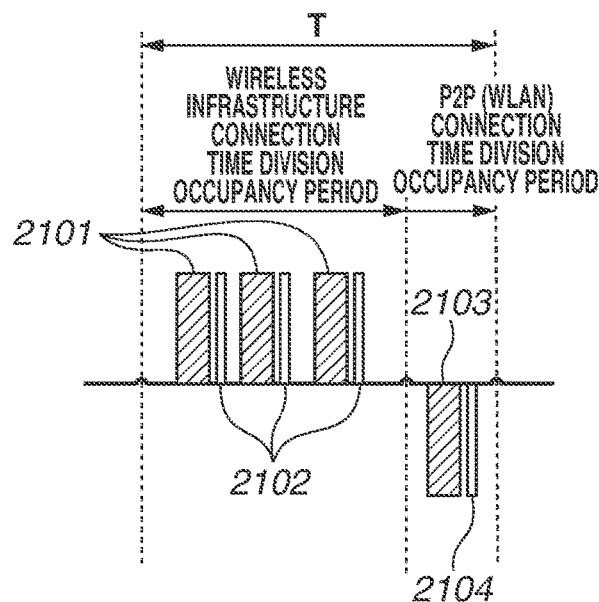

FIG. 21B illustrates an operation example in the case where the wireless infrastructure connection priority table of FIG. 20B is set into the wireless chip driver. In other words, FIG. 21B illustrates an operation in the case where the MFP 300 is connected to the external access point 400 and not in P2P (WLAN) connection with the external communication apparatus. As is clear from FIG. 21B, the MFP 300 performs communication so that the time division occupancy period of the wireless infrastructure connection is longer than that of the P2P (WLAN) connection. The ratio corresponds to the values in FIG. 20B. The MFP 300 can thus communicate with the access point 400 in the wireless infrastructure mode with sufficient communication speed. In FIG. 21B, the packets 2101 received by the MFP 300 are print data (data packets) received via the external access point 400, for example. In a case where the MFP 300 determines that the data packets are normal packets, the MFP 300 transmits acknowledgement (ACK) packets (packets 2102).

The packet 2103 received by the MFP 300 is a packet for P2P (WLAN) connection. Examples include a Probe Request. In a case where the packet 2103 is a Probe Request, the packet 2104 is a Probe Response.

Figure 21C:
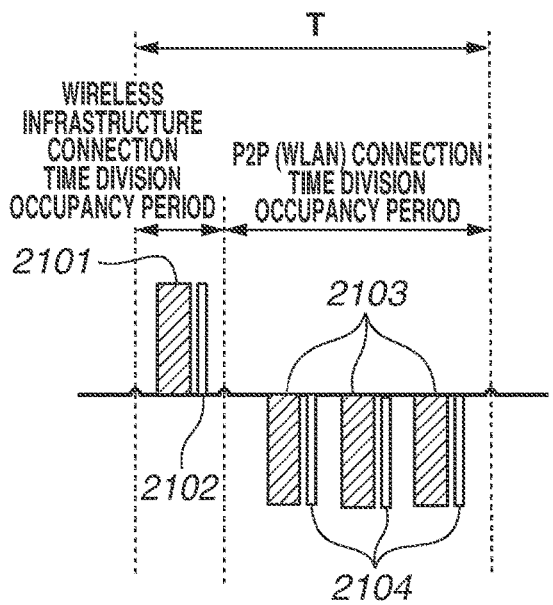

FIG. 21C illustrates an operation example in the case where the P2P connection priority table of FIG. 20C is set into the wireless chip driver. In other words, FIG. 21C illustrates an operation in the case where the MFP 300 is not connected to the external access point 400 and in P2P (WLAN) connection with the external communication apparatus. As is clear from FIG. 21C, the MFP 300 performs communication so that the time division occupancy period of the P2P (WLAN) connection is longer than that of the wireless infrastructure connection. The ratio corresponds to the values in FIG. 20C. The MFP 300 can thus communicate with the external communication apparatus in the P2P (WLAN) mode with sufficient communication speed. In FIG. 21C, the packet 2101 received by the MFP 300 is a beacon output from the external access point 400, for example. The packet 2102 is a connection request packet transmitted based on user operations on the MFP 300. A description thereof will be omitted here since a detailed description has been given with reference to FIG. 21A. The packets 2103 received by the MFP 300 are print data received via the P2P (WLAN) connection. In a case where the MFP 300 determines that the data packets are normal packets, the MFP 300 transmits ACK packets (packets 2104).

Figure 21D:
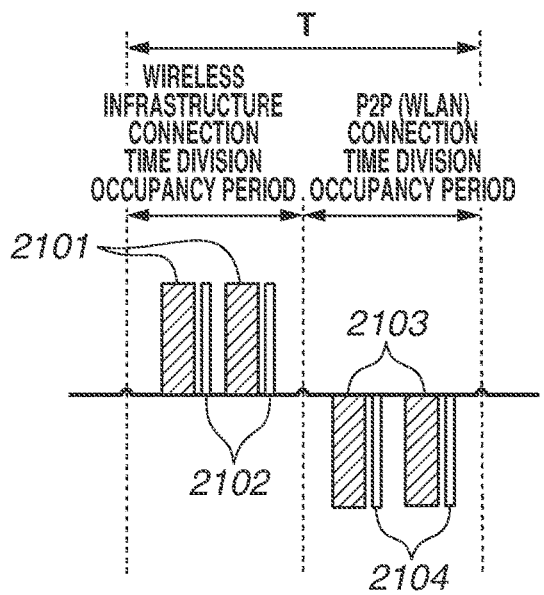

FIG. 21D illustrates an operation example in the case where the full active table of FIG. 20D is set into the wireless chip driver. In other words, FIG. 21D illustrates an operation in the case where the MFP 300 is connected to the external access point 400 and in P2P (WLAN) connection with the external communication apparatus. As is clear from FIG. 21D, the MFP 300 performs communication so that the time division occupancy period of the wireless infrastructure connection and that of the P2P (WLAN) connection are substantially the same. In FIG. 21D, the packets 2101 received by the MFP 300 are print data received via the external access point 400, for example. In a case where the MFP 300 determines that the data packets are normal packets, the MFP 300 transmits ACK packets (packets 2102). The packets 2103 received by the MFP 300 are print data received via the P2P (WLAN) connection. In a case where the data packets are determined to be normal packets, the MFP 300 transmits ACK packets (packets 2104). Now, return to FIG. 13. In step S1315, the MFP 300 enables the USB I/F. Then, the setting processing upon the initial activation ends. In other words, the USB I/F is enabled in both the cases where "wired LAN" is selected and where "wireless LAN" is selected. The MFP 300 does not necessarily need to enable the USB I/F, depending on settings based on user operations.

The CPU 602 of the MFP 300 can thus cause the wireless combination unit 616 to perform communication processing based on the selected wireless control table, and a drop in communication throughput can be reduced by the foregoing processing upon the initial activation. For example, a drop in communication throughput can be reduced by using the wireless combination unit 616 even in a case where different channels are used in the wireless infrastructure mode and the P2P (WLAN) mode. Moreover, a drop in communication throughput can also be reduced by the foregoing processing even in a case where the channel used in the wireless infrastructure mode and that used in the P2P (WLAN) mode are the same. The MFP 300 can thus improve convenience in running the P2P (WLAN) mode and the wireless infrastructure mode in parallel by using common hardware resources. In a case where the Bluetooth® Low Energy mode is enabled, the time division occupancies are determined by also taking into account the connection status in the Bluetooth® Low Energy mode. For example, in a case where the Bluetooth® Low Energy mode is enabled on the MFP 300, the MFP 300 initially outputs Advertising data by communication in the Bluetooth® Low Energy mode. Here, the time division occupancy is determined so that the beacon (Advertising data) can be transmitted at every 100 msec. The rest of the time may be divided based on the contents of the tables in FIGS. 20A to 20D.

<Setting for Switching Communication Modes Between Enabled and Disabled Based on LAN Settings>

Next, a method for setting the wireless infrastructure mode and the P2P (WLAN) mode in switching the communication modes between enabled and disabled will be described. The MFP 300 is configured so that communication modes to be used can be enabled or disabled on the I/F selection screen illustrated in FIG. 4C or via a cableless setup. The MFP 300 can activate the cableless setup mode by the user operating an operation screen of the MFP 300. Specifically, in a case where the user uses the operation screen of the MFP 300 to give an instruction for a cableless setup, the MFP 300 activates the software AP mode as in step S1304 and operates as an AP. In the present exemplary embodiment, the wired LAN and the wireless LAN are used in an exclusive manner, and the MFP 300 is unable to enable the wireless LAN with the wired LAN enabled. Similarly, the MFP 300 is unable to enable the wired LAN with the wireless LAN enabled. However, the wired LAN and the wireless LAN can be disabled in parallel. In the present exemplary embodiment, the Bluetooth® communication function is also implemented by the wireless combination unit 616 like the wireless LAN. The Bluetooth® communication function is thus configured to not be enabled while the wired LAN is enabled. The USB I/F is unable to be disabled by the user's setting. The USB I/F is always enabled upon activation of the MFP 300, and configured to be usable with the wired LAN, the wireless LAN, or Bluetooth® Low Energy in parallel. The MFP 300 is configured to enable or disable the wireless infrastructure mode and the P2P (WLAN) mode independently. For example, the user gives an instruction to enable wireless direct (i.e., the P2P (WLAN) mode) using the I/F selection screen, and then gives an instruction to enable the wireless infrastructure mode. Based on such instructions, the MFP 300 can enable the P2P (WLAN) mode and the wireless infrastructure mode in parallel. In other words, the MFP 300 can maintain the wireless connection in the P2P (WLAN) mode and the wireless connection in the wireless infrastructure mode in parallel. While the connections can be maintained in parallel, data communication is performed not in parallel but sequentially. For example, in a case where the wireless connection in the P2P (WLAN) mode and the wireless connection in the wireless infrastructure mode are maintained in parallel, the MFP 300 initially performs data communication in the wireless infrastructure mode for a predetermined period, and then performs data communication in the P2P (WLAN) mode. The MFP 300 is also configured so that the Bluetooth® Low Energy mode can be enabled and disabled independent of the P2P (WLAN) mode and the wireless infrastructure mode. Here, the Bluetooth® Low Energy mode can be enabled along with the P2P (WLAN) mode and/or the wireless infrastructure mode in parallel. In other words, the MFP 300 can maintain the wireless connections in the P2P (WLAN) mode and the wireless infrastructure mode and the wireless connection in the Bluetooth® Low Energy mode in parallel. The MFP 300 can thus maintain the wireless connection in the P2P (WLAN) mode, the wireless connection in the wireless infrastructure mode, and the wireless connection using Bluetooth® Low Energy in parallel. The enabled/disabled states are stored in the nonvolatile memory 605, and the MFP 300 refers to the information upon next activation after power-off and enables the communication modes based on the stored information. In a case where the LAN setting items are initialized, the MFP 300 disables the respective communication modes. In such a case, the MFP 300 also disables the wired LAN and enters a state of performing neither the wired LAN communication nor the wireless LAN communication. In a case where the LAN settings are initialized, the user uses the MFP 300 by individually performing setting changes to enable desired communication modes.

Figure 14:
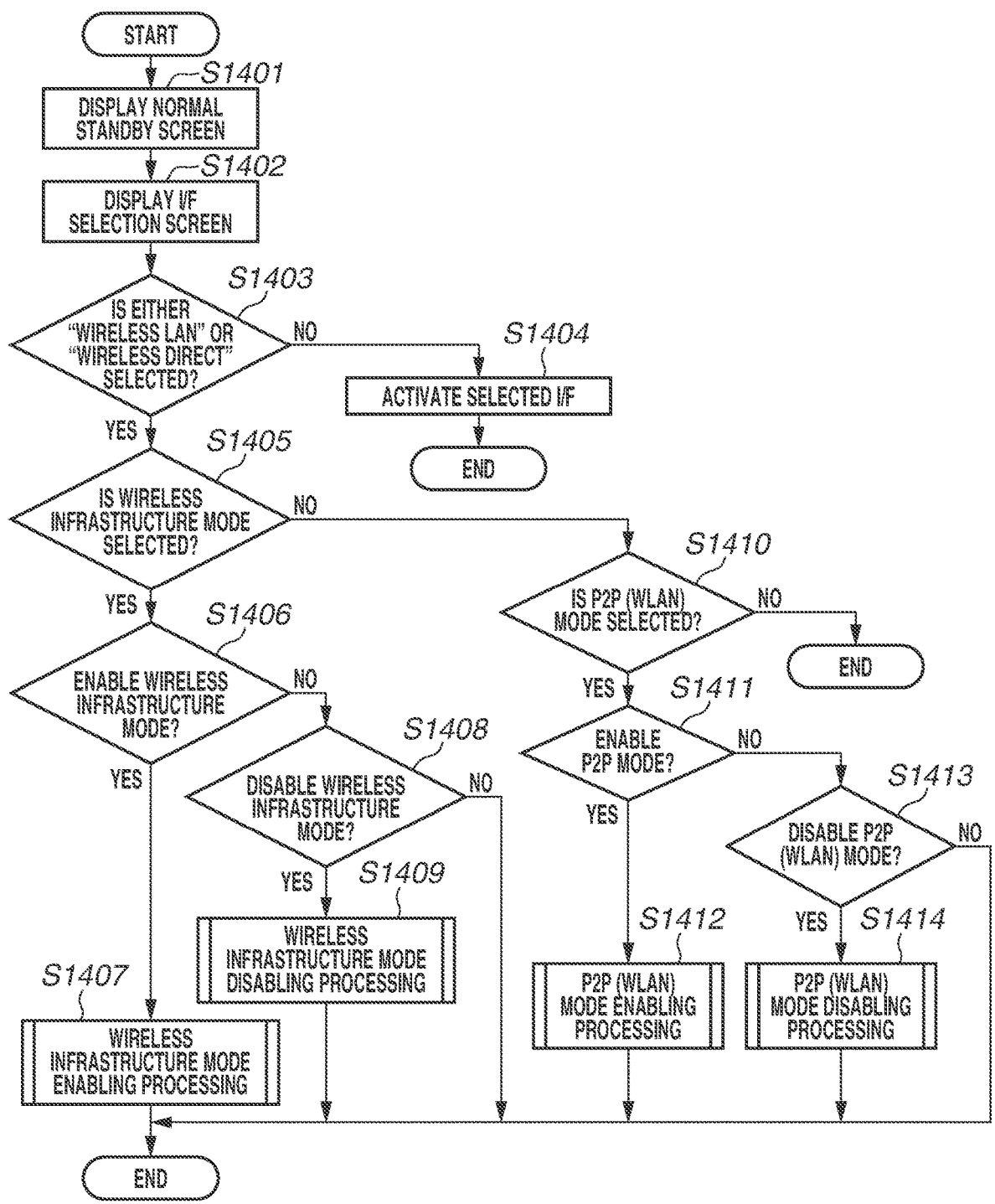
FIG. 14 is a flowchart illustrating an example of a procedure of interface processing by local area network (LAN) setting.

Processing in a case where the user operates the operation screen of the MFP 300 to perform settings to enable or disable the wireless infrastructure mode and the P2P (WLAN) mode independently will be described with reference to FIG. 14.

After the completion of the foregoing initial activation processing (S1301 to S1315), in step S1401, the MFP 300 displays a normal standby screen (home screen) (FIG. 4A).

In step S1402, the MFP 300 displays the I/F selection screen (FIG. 4C) in response to the user's operation on the normal standby screen. In step S1403, the MFP 300 determines whether either "wireless LAN" or "wireless direct" is selected.

In a case where the MFP 300 determines that neither "wireless LAN" nor "wireless direct" is selected (NO in step S1403), the processing proceeds to step S1404. In step S1404, the MFP 300 activates the selected I/F. Then, the processing ends. For example, in a case where "wired LAN" is selected in FIG. 4C, the determination of step S1403 is NO.

Figure 15:
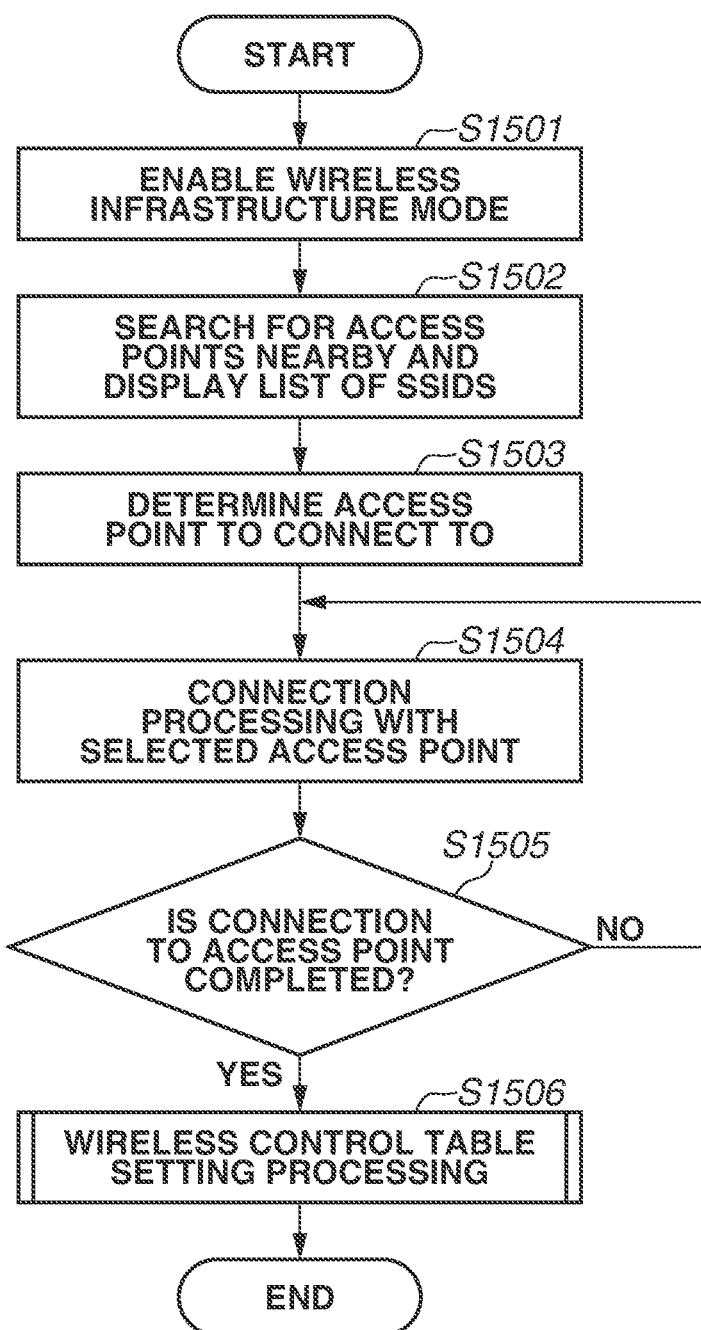
FIG. 15 is a flowchart illustrating an example of a wireless infrastructure mode enabling processing sequence.

On the other hand, in a case where the MFP 300 determines that either "wireless LAN" or "wireless direct" is selected on the I/F selection screen of FIG. 4C (YES in step S1403), the processing proceeds to step S1405. In step S1405, the MFP 300 determines whether the wireless infrastructure mode is selected. In a case where the MFP 300 determines that the wireless infrastructure mode is selected (YES in step S1405), the processing proceeds to step S1406. In step S1406, the MFP 300 determines whether the wireless infrastructure mode is enabled by a user operation. In a case where the MFP 300 determines that the wireless infrastructure mode is enabled (YES in step S1406), the processing proceeds to step S1407. In step S1407, the MFP 300 performs wireless infrastructure mode enabling processing. The wireless infrastructure mode enabling processing will be described with reference to FIG. 15.

In step S1501, the MFP 300 enables the wireless infrastructure mode, based on the user operation on the operation screen. In step S1502, the MFP 300 searches for access points nearby and displays a list of SSIDs. In step S1503, the MFP 300 determines an access point to connect to, based on user operations. In step S1504, the MFP 300 performs connection processing with the selected access point.

In step S1505, the MFP 300 determines whether the connection to the access point is completed. In a case where the MFP 300 determines that the connection to the access point is not completed (NO in step S1505), the processing returns to step S1504.

On the other hand, in a case where the MFP 300 determines that the connection to the access point is completed (YES in step S1505), the processing proceeds to step S1506. In step S1506, the MFP 300 performs wireless control table setting processing. Since the wireless control table setting processing is similar to the processing of steps S1901 to S1910 described above, a redundant detailed description thereof will be omitted and brief examples will be given. For example, in a case where the MFP 300 is operating in only the wireless infrastructure mode enabled by an operation on the I/F selection screen displayed in step S1402, the determination of step S1901 is NO and the occupancy of the wireless infrastructure mode is set to 100%. By contrast, in a case where the MFP 300 is operating in both the wireless infrastructure mode and the P2P (WLAN) mode enabled by operations on the I/F selection screen displayed in step S1402, the determination of step S1901 is YES and steps S1902 to S1907 are performed. Returning to FIG. 14, the wireless infrastructure mode enabling processing ends. In the processing procedure of FIG. 15, the processing of S1506 is described to not be performed until the determination of step S1505 is YES. However, other processing procedures may be performed. Specifically, in a case where the determination of step S1505 is NO, the MFP 300 retries the processing of step S1504. The MFP 300 may then perform step S1506 in a case where the number of retries of step S1504 reaches a predetermined number and even in a case where the connection processing with the access point is not completed.

In a case where the MFP 300 determines that the wireless infrastructure mode is not enabled (NO in step S1406), the processing proceeds to step S1408. In step S1408, the MFP 300 determines whether the wireless infrastructure mode is disabled by a user operation. In a case where the MFP 300 determines that the wireless infrastructure mode is not disabled (NO in step S1408), the processing ends.

Figure 16:
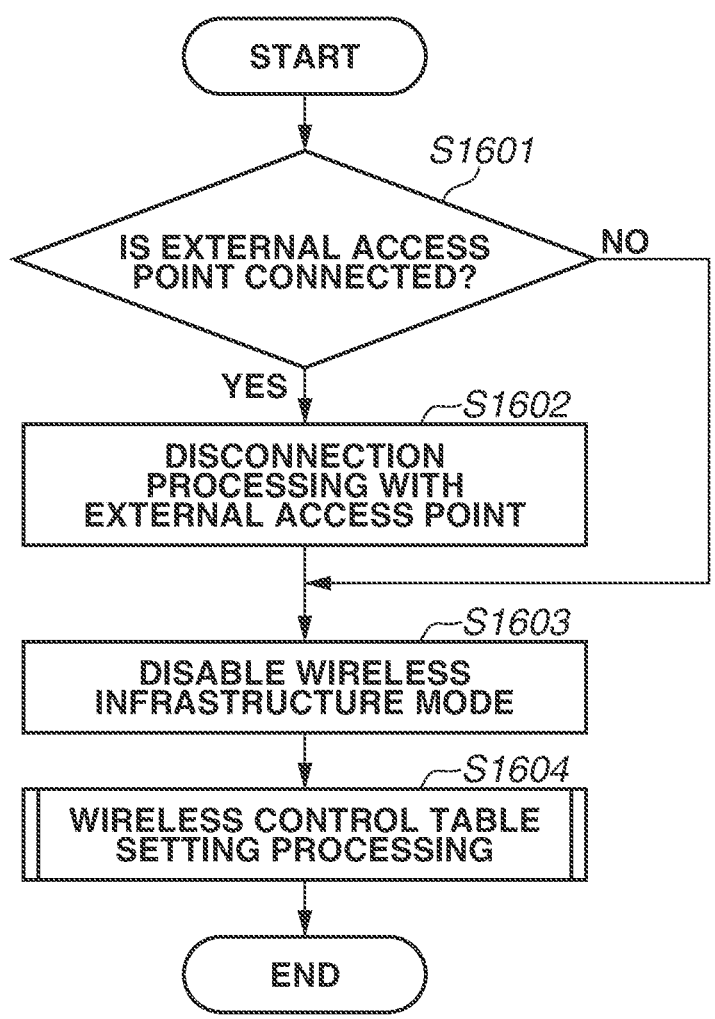
FIG. 16 is a flowchart illustrating an example of a wireless infrastructure mode disabling processing sequence.

On the other hand, in a case where the MFP 300 determines that the wireless infrastructure mode is disabled (YES in step S1408), the processing proceeds to step S1409. In step S1409, the MFP 300 performs wireless infrastructure mode disabling processing. The wireless infrastructure mode disabling processing will be described with reference to FIG. 16.

In a case where the user operates the operation screen to disable the wireless infrastructure mode, then in step S1601, the MFP 300 determines whether an external access point is connected. In a case where the MFP 300 determines that no external access point is connected (NO in step S1601), the processing proceeds to step S1603. On the other hand, in a case where the MFP 300 determines that an external access point is connected (YES in step S1601), the processing proceeds to step S1602. In step S1602, the MFP 300 performs disconnection processing with the external access point. The processing proceeds to step S1603.

In step S1603, the MFP 300 disables the wireless infrastructure mode. In step S1604, the MFP 300 performs wireless control table setting processing. Since the wireless control table setting processing is similar to the processing of steps S1901 to S1910 described above, a redundant detailed description thereof will be omitted. Returning to FIG. 14, the wireless infrastructure mode disabling processing of step S1409 ends.

Figure 17:
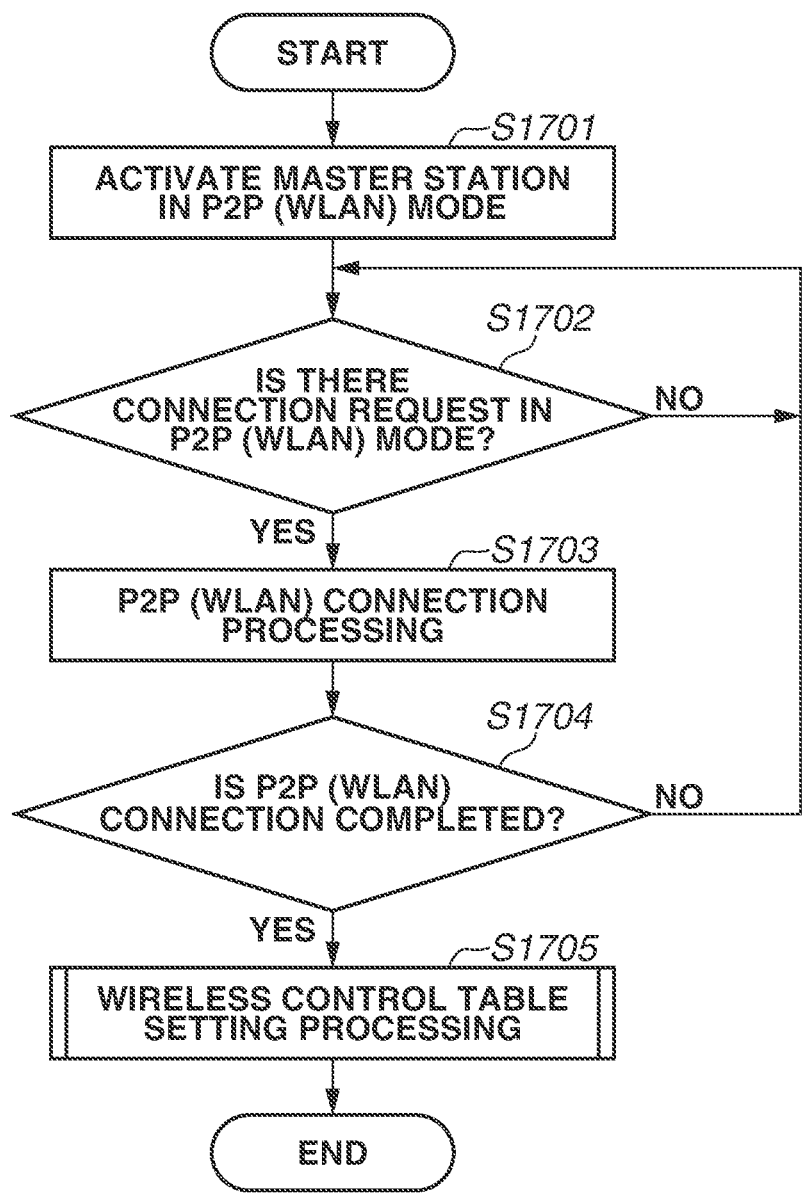
FIG. 17 is a flowchart illustrating an example of a peer-to-peer (P2P) mode enabling processing sequence.

In a case where the MFP 300 determines that the wireless infrastructure mode is not selected (NO in step S1405), the processing proceeds to step S1410. In step S1410, the MFP 300 determines whether "wireless direct" (i.e., the P2P (WLAN) mode) is selected on the I/F selection screen of FIG. 4C. In a case where the MFP 300 determines that the P2P (WLAN) mode is not selected (NO in step S1410), the processing ends. On the other hand, in a case where the MFP 300 determines that the P2P (WLAN) mode is selected (YES in step S1410), the processing proceeds to step S1411. In step S1411, the MFP 300 determines whether the P2P (WLAN) mode is enabled by a user operation. In a case where the MFP 300 determines that the P2P (WLAN) mode is enabled (YES in step S1411), the processing proceeds to step S1412. In step S1412, the MFP 300 performs P2P (WLAN) mode enabling processing. The P2P (WLAN) mode enabling processing will be described with reference to FIG. 17.

In response to a user operation on the operation screen and the P2P (WLAN) mode is enabled, then in step S1701, the MFP 300 activates a master station in the P2P (WLAN) mode and enters a P2P (WLAN) connection request waiting state. The master station activated in step S1701 may be a software AP or a Wi-Fi Direct group owner. In step S1702, the MFP 300 determines whether there is a connection request in the P2P (WLAN) mode. In a case where the MFP 300 determines that there is no connection request in the P2P (WLAN) mode (NO in step S1702), the processing returns to step S1702 to enter the P2P (WLAN) connection request waiting state again. On the other hand, in a case where the MFP 300 determines that there is a connection request in the P2P (WLAN) mode (YES in step S1702), the processing proceeds to step S1703. In step S1703, the MFP 300 performs P2P (WLAN) connection processing.

In step S1704, the MFP 300 determines whether the P2P (WLAN) connection is completed. In a case where the MFP 300 determines that the P2P (WLAN) connection is not completed (NO in step S1704), the processing returns to step S1702 and the MFP 300 enters the P2P (WLAN) connection request waiting state again. On the other hand, in a case where the MFP 300 determines that the P2P (WLAN) connection is determined to be completed (YES in step S1704), the processing proceeds to step S1705. In step S1705, the MFP 300 performs wireless control table setting processing. Since the wireless control table setting processing of step S1705 is similar to that of steps S1901 to S1910 described above, a detailed redundant description thereof will be omitted. Returning to FIG. 14, the P2P (WLAN) mode enabling processing of step S1412 ends. In the processing procedure of FIG. 17, the processing of S1705 is described to not be performed until the determination of step S1704 is YES. However, other processing procedures may be performed. Specifically, the MFP 300 may perform step S1705 in a case where a predetermined time has elapsed without receiving the P2P (WLAN) mode connection request. Alternatively, in a case where the determination of step S1704 is NO, the MFP 300 retries the processing of steps S1702 and S1703. The MFP 300 may then perform step S1705 in a case where the number of retries of step S1703 reaches a predetermined number and the connection processing in the P2P (WLAN) mode is not completed.

On the other hand, in a case where the MFP 300 determines that the P2P (WLAN) mode is not enabled (NO in step S1411), the processing proceeds to step S1413. In step S1413, the MFP 300 determines whether the P2P (WLAN) mode is disabled. In a case where the MFP 300 determines that the P2P (WLAN) mode is not disabled (NO in step S1413), the processing ends.

Figure 18:
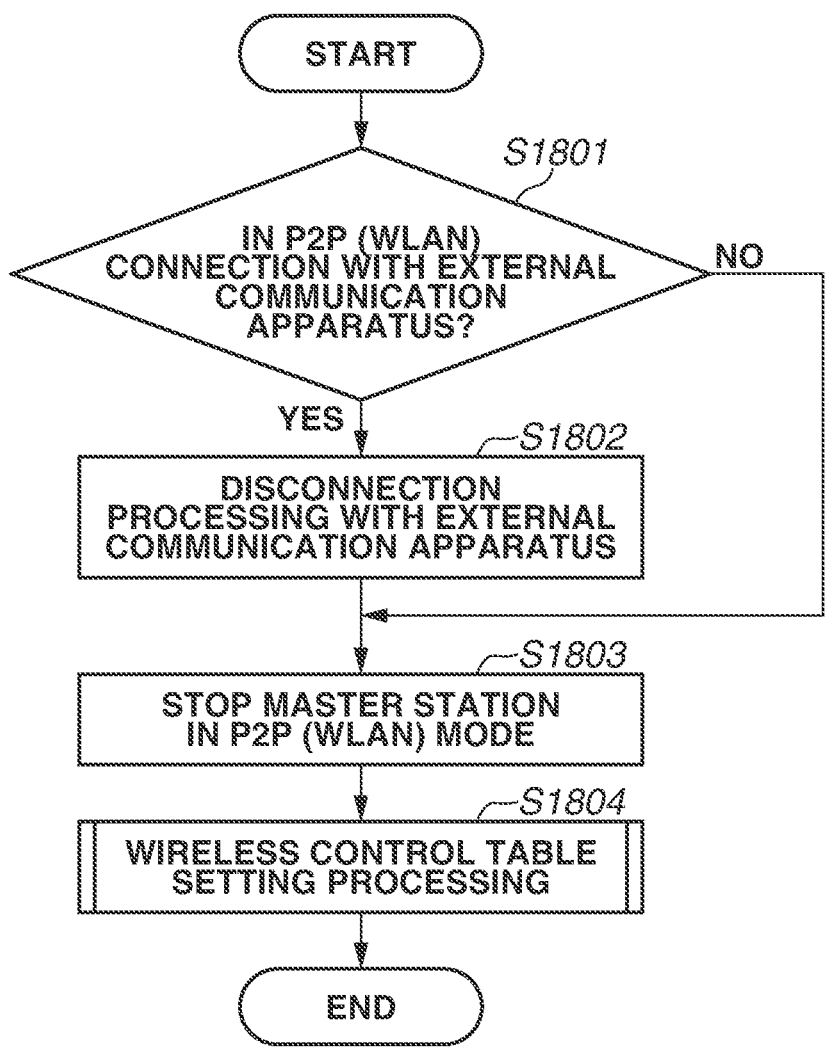
FIG. 18 is a flowchart illustrating an example of a P2P mode disabling processing sequence.

In a case where the MFP 300 determines that the P2P (WLAN) mode is disabled (YES in step S1413), the processing proceeds to step S1414. In step S1414, the MFP 300 performs P2P (WLAN) mode disabling processing. The P2P (WLAN) mode disabling processing will be described with reference to FIG. 18.

In a case where the user operates the operation screen to input an instruction to disable the wireless direct (P2P (WLAN) mode), then in step S1801, the MFP 300 determines whether the MFP 300 is in P2P (WLAN) connection with an external communication apparatus.

In a case where the MFP 300 determines that the MFP 300 is not in P2P (WLAN) connection with any external communication apparatus (NO in step S1801), the processing proceeds to step S1803. On the other hand, in a case where the MFP 300 determines that the MFP 300 is in P2P (WLAN) connection with an external communication apparatus (YES in step S1801), the processing proceeds to step S1802. In step S1802, the MFP 300 performs disconnection processing with the external communication apparatus. The processing proceeds to step S1803.

As the P2P (WLAN) mode disabling processing, in step S1803, the MFP 300 stops the master station in the P2P (WLAN) mode. In step S1804, the MFP 300 performs wireless control table setting processing. Since the wireless control table setting processing is similar to the processing of steps S1901 to S1910 described above, a detailed redundant description thereof will be omitted. Returning to FIG. 14, the P2P (WLAN) mode disabling processing ends.

The MFP 300 can thus cause the wireless combination unit 616 to perform communication processing based on the selected wireless control table, and a drop in communication throughput in switching the communication modes between enabled and disabled can be reduced. For example, a drop in communication throughput can be reduced by using the wireless combination unit 616 even in a case where different channels are used in the wireless infrastructure mode and the P2P (WLAN) mode. Moreover, a drop in communication throughput can also be reduced by the foregoing processing even in a case where the channel that is used in the wireless infrastructure mode and that is used in the P2P (WLAN) mode are the same. The MFP 300 can thus improve the convenience in running the P2P (WLAN) mode and the wireless infrastructure mode in parallel by using common hardware resources. In a case where the Bluetooth® Low Energy mode is enabled, the time division occupancies are determined by also taking into account the connection status in the Bluetooth® Low Energy mode. For example, in a case where the Bluetooth® Low Energy mode is enabled on the MFP 300, the MFP 300 initially outputs Advertising data by communication in the Bluetooth® Low Energy mode. Here, the time division occupancy is determined so that the beacon (Advertising data) can be transmitted at every 100 msec. The rest of the time may be divided based on the contents of the tables in FIGS. 20A to 20D.

As described above, the MFP 300 according to the present exemplary embodiment can appropriately set the durations of the respective communication periods in the wireless infrastructure mode and the P2P (WLAN) mode per unit time, based on the connection states. The MFP 300 then sets the communication periods of a respective plurality of communication modes, based on priorities and time division occupancies identified. This enables appropriate allocation of communication periods to communication modes where high throughput is desired.

Other Exemplary Embodiments

In the foregoing exemplary embodiment, the modes in which communication compliant with the wireless LAN standard is performed are described as examples of the communication modes to be used. However, the communication apparatuses may be configured so that communication modes of other wireless communication standards can be used. For example, in a case where the wireless LAN standard is modified, another wireless LAN standard is added, or a new wireless communication standard is available, the foregoing discussion can be applied by using the added or modified wireless LAN standard or the new wireless communication standard. For example, the foregoing discussion is also applicable in a case where a new connection mode is made usable by the addition or modification of a wireless communication standard.

In the foregoing example, whether to use the standby table or to use the wireless infrastructure connection priority table or the P2P connection priority table is described to be determined based on whether external apparatuses are connected in the wireless infrastructure mode and the P2P (WLAN) mode. However, this is not restrictive, and which of the tables of FIGS. 20A to 20D to use may be determined based on a user's instruction. More specifically, even in a case where the MFP 300 is connected to the access point 400 and in P2P (WLAN) connection with the external communication apparatus, the wireless infrastructure connection priority table may be determined based on a user instruction when the user wants to give higher priority to the wireless infrastructure connection.

In the foregoing exemplary embodiment, the processing is described to be performed by the MFP 300. However, the processing may be performed by devices other than an MFP (such as a digital camera and a smartphone).

To improve throughput, the MFP 300 may perform communication with a 40-MHz frequency bandwidth using a plurality of channels for communication, depending on the situation. For example, in a case where the P2P (WLAN) mode is disabled and the wireless infrastructure mode is enabled, the MFP 300 waits in an operable state in both a 20-MHz mode and a 40-MHz mode. Then, in a case where the MFP 300 receives information indicating that the external access point 400 is capable of 40-MHz communication, the MFP 300 may determine to operate in the 40-MHz mode. The 40-MHz mode is supported by IEEE 802.11n. In a case where the MFP 300 joins a 2.4-GHz wireless network constructed by the external access point 400 in the 40-MHz mode, the MFP 300 periodically performs an overlapping basic service set (OBSS) scan in compliance with the IEEE 802.11n standard. Wireless networks not supporting the IEEE 802.11n or not accommodating communication in the 40-MHz mode can be found by an OBSS scan. In a case where such wireless networks are found, the MFP 300 transmits a report to the external access point 400. The external access point 400 receiving the report switches from the wireless network supporting the 40-MHz mode to a wireless network supporting only the 20-MHz mode as appropriate. The MFP 300 may perform communication with other frequency bandwidths.

In the foregoing exemplary embodiment, 2.4 GHz and 5 GHz are described as the frequencies to be used, whereas other frequencies may be used. For example, 6 GHz may be used.

An exemplary embodiment of the present disclosure can also be implemented by processing for supplying a program for implementing one or more functions of the foregoing exemplary embodiment to a system or an apparatus via a network or a storage medium, and reading and executing the program by one or more processors in a computer of the system or apparatus. A circuit for implementing one or more functions (such as an application specific integrated circuit (ASIC)) may be used for implementation.

According to an exemplary embodiment of the present disclosure, convenience of wireless communication can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-111974, filed Jun. 29, 2020, which is hereby incorporated by reference herein in its entirety.

What is claimed is:

1. A communication apparatus that includes a communication unit configured to perform a first communication mode in which the communication unit communicates with a terminal apparatus via wireless communication with an external wireless base station and a second communication mode in which the communication unit directly performs wireless communication with the terminal apparatus without intervention of the external wireless base station, the communication apparatus comprising:
    a setting unit configured to enable at least either one of the first communication mode and the second communication mode; and
    a control unit configured to perform communication processing in the first communication mode and the second communication mode to set a communication period of the first communication mode per unit time to be longer than that of the second communication mode in a case where both the first communication mode and the second communication mode are enabled, a communication partner apparatus in the first communication mode is determined, and a communication partner apparatus in the second communication mode is not determined, and perform the communication processing in the first communication mode and the second communication mode to set the communication period of the second communication mode per unit time to be longer than that of the first communication mode in a case where both the first communication mode and the second communication mode are enabled, the communication partner apparatus in the second communication mode is determined, and the communication partner apparatus in the first communication mode is not determined.

2. The communication apparatus according to claim 1, wherein the control unit is configured to perform the communication processing in the first communication mode and the second communication mode to set the communication periods of the first communication mode and second communication mode per unit time to be substantially a same in a case where both the first communication mode and the second communication mode are enabled and the communication partner apparatus in the first communication mode and the communication partner apparatus in the second communication mode are determined.

3. The communication apparatus according to claim 1, wherein the control unit is configured to perform the communication processing in the first communication mode and second communication mode to set the communication periods of the first communication mode and the second communication mode per unit time to be substantially a same in a case where both the first communication mode and the second communication mode are enabled and neither the communication partner apparatus in the first communication mode nor the communication partner apparatus in the second communication mode is determined.

4. The communication apparatus according to claim 1, further comprising
    an antenna configured to support the wireless communication in the first communication mode and the second communication mode,
    wherein in a case where the first communication mode and the second communication mode are enabled, the wireless communication in the first communication mode and the wireless communication in the second communication mode are sequentially switched.

5. The communication apparatus according to claim 1, wherein the first communication mode and the second communication mode are communication modes compliant with an Institute of Electrical and Electronics Engineers (IEEE) 802.11 standard.

6. The communication apparatus according to claim 1, wherein the first communication mode and the second communication mode use different frequencies.

7. The communication apparatus according to claim 1, wherein the communication unit is configured to operate as a master station of a wireless network in the second communication mode.

8. The communication apparatus according to claim 1, further comprising a print control unit configured to perform print processing, based on print data received by the wireless communication in at least either one of the first communication mode and the second communication mode.

9. A communication apparatus that includes a communication unit configured to perform a first communication mode in which the communication unit communicates with a terminal apparatus via wireless communication with an external wireless base station and a second communication mode in which the communication unit directly performs wireless communication with the terminal apparatus without intervention of the external wireless base station, the communication apparatus comprising:
    a setting unit configured to enable at least either one of the first communication mode and the second communication mode; and
    a control unit configured to perform communication processing in the first communication mode and the second communication mode to set a communication period of the first communication mode per unit time to be longer than that of the second communication mode in a case where both the first communication mode and the second communication mode are enabled and the first communication mode is given priority over the second communication mode, and perform the communication processing in the first communication mode and the second communication mode to set the communication period of the second communication mode per unit time to be longer than that of the first communication mode in a case where both the first communication mode and the second communication mode are enabled and the second communication mode is given priority over the first communication mode.

10. The communication apparatus according to claim 9, the first communication mode and the second communication mode are communication modes compliant with an IEEE 802.11 standard.

11. The communication apparatus according to claim 9, wherein the first communication mode and the second communication mode use different frequencies.

12. The communication apparatus according to claim 9, wherein the communication unit is configured to operate as a master station of a wireless network in the second communication mode.

13. The communication apparatus according to claim 9, further comprising a print control unit configured to perform print processing, based on print data received by the wireless communication in at least either one of the first communication mode and the second communication mode.

14. A control method executed by a communication apparatus including a communication unit configured to perform a first communication mode in which the communication unit communicates with a terminal apparatus via wireless communication with an external wireless base station and a second communication mode in which the communication unit directly performs wireless communication with the terminal apparatus without intervention of the external wireless base station, the control method comprising:
    enabling at least either one of the first communication mode and the second communication mode; and
    performing communication processing in the first communication mode and the second communication mode to set a communication period of the first communication mode per unit time to be longer than that of the second communication mode in a case where both the first communication mode and the second communication mode are enabled, a communication partner apparatus in the first communication mode is determined, and a communication partner apparatus in the second communication mode is not determined, and performing the communication processing in the first communication mode and the second communication mode to set the communication period of the second communication mode per unit time to be longer than that of the first communication mode in a case where both the first communication mode and the second communication mode are enabled, the communication partner apparatus in the second communication mode is determined, and the communication partner apparatus in the first communication mode is not determined.

15. The control method according to claim 14, wherein the communication processing in the first communication mode and the second communication mode is performed to set the communication periods of the first communication mode and the second communication mode per unit time to be substantially a same in a case where both the first communication mode and the second communication mode are enabled and the communication partner apparatus in the first communication mode and the communication partner apparatus in the second communication mode are determined.

16. The control method according to claim 14, wherein the communication processing in the first communication mode and the second communication mode is performed to set the communication periods of the first communication mode and the second communication mode per unit time to be substantially a same in a case where both the first communication mode and the second communication mode are enabled and neither the communication partner apparatus in the first communication mode nor the communication partner apparatus in the second communication mode is determined.

17. The control method according to claim 14,
    wherein the communication apparatus further includes an antenna configured to support the wireless communication in the first communication mode and the second communication mode, and
    wherein in a case where the first communication mode and the second communication mode are enabled, the wireless communication in the first communication mode and the wireless communication in the second communication mode are sequentially switched.

* * * * *